(12) United States Patent
Thompson

(10) Patent No.: US 8,640,461 B2
(45) Date of Patent: Feb. 4, 2014

(54) HEAT EXCHANGERS AND TOWER STRUCTURE FOR DENSITY-DRIVEN POWER GENERATION

(76) Inventor: Steven A. Thompson, Springfield, OR (US)

( * ) Notice: Subject to any disclaimer, the term of this patent is extended or adjusted under 35 U.S.C. 154(b) by 998 days.

(21) Appl. No.: 12/709,215

(22) Filed: Feb. 19, 2010

(65) Prior Publication Data

US 2010/0212321 A1    Aug. 26, 2010

Related U.S. Application Data

(60) Provisional application No. 61/154,352, filed on Feb. 20, 2009.

(51) Int. Cl.
*F01K 27/00*  (2006.01)
*F01K 7/00*   (2006.01)

(52) U.S. Cl.
USPC .............................. 60/641.1; 60/675; 165/145

(58) Field of Classification Search
USPC .................. 60/641.1, 670, 675; 165/144–145
See application file for complete search history.

(56) References Cited

U.S. PATENT DOCUMENTS

| | | |
|---|---|---|
| 1,032,236 A | 7/1912 | Patten |
| 1,343,577 A | 6/1920 | Okey |
| 1,493,368 A | 5/1924 | Merz |
| 2,597,249 A | 5/1952 | Kollsman |
| 2,636,129 A | 4/1953 | Agnew |
| 3,375,664 A | 4/1968 | Wells |
| 3,894,393 A | 7/1975 | Carlson |
| 4,022,024 A | 5/1977 | Abeles |
| 4,157,014 A | 6/1979 | Clark et al. |
| 4,182,124 A | 1/1980 | Kraus et al. |
| 4,187,686 A * | 2/1980 | Pommier ...................... 60/647 |
| 4,192,145 A | 3/1980 | Tanaka |
| 4,269,031 A | 5/1981 | Loskot |
| 4,318,275 A | 3/1982 | Brown et al. |
| 4,373,339 A | 2/1983 | Sorensen |
| 4,391,099 A | 7/1983 | Sorensen |
| 4,501,320 A * | 2/1985 | Lipets et al. .................. 165/144 |

(Continued)

OTHER PUBLICATIONS

International Search Report & Written Opinion in counterpart international App No. PCT/US2010/024739, Sep. 2010.

*Primary Examiner* — Hoang Nguyen
(74) *Attorney, Agent, or Firm* — David S. Alavi

(57) ABSTRACT

A power-generating tower comprises: at least one of the lower heat-exchange assemblies, at least one of the upper heat-exchange assemblies, a tower structure arranged to support each upper heat-exchange assembly, at least one ascending circulating-fluid column within the tower structure, at least one descending circulating-fluid column within the tower structure, and at least one turbine. Each ascending column is arranged and connected to receive the circulating fluid from at least one of the lower heat-exchange assemblies and to convey the circulating fluid thus received upward and into at least one of the upper heat-exchange assemblies. Each descending column is arranged and connected to receive the circulating fluid from at least one of the upper heat-exchange assemblies and to convey the circulating fluid thus received downward and into at least one of the lower heat-exchange assemblies. The turbine is arranged to be driven by flow of circulating fluid.

2 Claims, 22 Drawing Sheets

(56) References Cited

U.S. PATENT DOCUMENTS

| | | | |
|---|---|---|---|
| 4,757,687 A * | 7/1988 | Nasser | 60/675 |
| 4,760,706 A * | 8/1988 | Nasser | 60/675 |
| 4,767,938 A | 8/1988 | Bervig | |
| 5,488,828 A | 2/1996 | Brossard | |
| 5,809,912 A | 9/1998 | Hansen | |
| 6,412,281 B2 * | 7/2002 | Cover | 60/670 |
| 6,422,016 B2 * | 7/2002 | Alkhamis | 60/641.1 |
| 6,510,687 B1 | 1/2003 | Zaslavsky et al. | |
| 2003/0192737 A1 | 10/2003 | Han et al. | |
| 2005/0120715 A1 | 6/2005 | Labrador | |
| 2008/0053137 A1 * | 3/2008 | Higashiyama | 62/324.6 |

* cited by examiner

US 8,640,461 B2

HEAT EXCHANGERS AND TOWER STRUCTURE FOR DENSITY-DRIVEN POWER GENERATION

BENEFIT CLAIMS TO RELATED APPLICATIONS

This application claims benefit of U.S. provisional App. No. 61/154,352 filed Feb. 20, 2009 in the name of Steven A. Thompson, said provisional application being hereby incorporated by reference as if fully set forth herein.

BACKGROUND

The field of the present invention relates to density-driven heat engines. In particular, heat exchangers and a tower structure are disclosed for density-driven power generation.

Various density-driven heat engines and power generators have been disclosed previously. Some of these are described in:

U.S. Pat. No. 1,032,236 entitled "Liquid expanding and contracting power generating system" issued Jul. 9, 1912 to Patten;

U.S. Pat. No. 1,343,577 entitled "Heat engine" issued Jun. 15, 1920 to Okey;

U.S. Pat. No. 1,493,368 entitled "Production of motive force" issued May 6, 1924 to Merz;

U.S. Pat. No. 2,597,249 entitled "Thermodynamic engine" issued May 20, 1952 to Kollsman;

U.S. Pat. No. 2,636,129 entitled "Solar engine" issued Apr. 21, 1953 to Agnew;

U.S. Pat. No. 3,375,664 entitled "Convection current power generator" issued Apr. 2, 1968 to Wells;

U.S. Pat. No. 3,894,393 entitled "Power generation through controlled convection (aeroelectric power generation)" issued Jul. 15, 1975 to Carlson;

U.S. Pat. No. 4,022,024 entitled "Thermosiphon engine and method" issued May 10, 1977 to Abeles;

U.S. Pat. No. 4,157,014 entitled "Differential pressure system for generating power" issued Jun. 5, 1979 to Clark et al;

U.S. Pat. No. 4,182,124 entitled "Gravity augmented air compression turbine power plant" issued Jan. 8, 1980 to Kraus et al;

U.S. Pat. No. 4,187,686 entitled "Power generator utilizing elevation-temperature differential" issued Feb. 12, 1980 to Pommier;

U.S. Pat. No. 4,192,145 entitled "Process for utilizing energy produced by the phase change of liquid" issued Mar. 11, 1980 to Tanaka;

U.S. Pat. No. 4,269,031 entitled "Heat engine" issued May 26, 1981 to Loskot;

U.S. Pat. No. 4,318,275 entitled "Atmospheric thermal energy conversion system" issued Mar. 9, 1982 to Brown et al;

U.S. Pat. No. 4,373,339 entitled "Thermal energy conversion system and method utilizing unencased expandites" issued Feb. 15, 1983 to Sorensen;

U.S. Pat. No. 4,391,099 entitled "Atmospheric thermal energy conversion utilizing inflatable pressurized rising conduit" issued Jul. 5, 1983 to Sorensen;

U.S. Pat. No. 4,757,687 entitled "System for current generation" issued Jul. 19, 1988 to Nasser;

U.S. Pat. No. 4,767,938 entitled "Fluid dynamic energy producing device" issued Aug. 30, 1988 to Bervig;

U.S. Pat. No. 5,488,828 entitled "Energy generating apparatus" issued Feb. 6, 1996 to Brossard; and U.S. Pat. No. 6,510,687 entitled "Renewable resource hydro/aero-power generation plant and method of generating hydro/aero-power" issued Jan. 28, 2003 to Zaslaysky et al.

Each of said prior patents is hereby incorporated by reference as if fully set forth herein.

SUMMARY

A power-generating tower comprises: at least one lower heat-exchange assembly, at least one upper heat-exchange assembly, a tower structure arranged to support each upper heat-exchange assembly at a desired elevation above the lower heat-exchange assembly, at least one ascending circulating-fluid column within the tower structure, at least one descending circulating-fluid column within the tower structure, and at least one turbine. Each ascending column is arranged and connected to receive circulating fluid from at least one of the lower heat-exchange assemblies and to convey the circulating fluid thus received upward and into at least one upper heat-exchange assembly. Each descending column is arranged and connected to receive the circulating fluid from at least one upper heat-exchange assembly and to convey the circulating fluid thus received downward and into at least one lower heat-exchange assembly. The turbine is arranged to be driven by flow of the circulating fluid.

Each lower heat-exchange assembly comprises multiple heat-exchanging subunits. Each of the heat-exchanging subunits comprises (i) an ambient-fluid passage, (ii) at least one circulating-fluid inlet, (iii) at least one circulating-fluid outlet, and (iv) multiple heat-exchange tubes. Each of the multiple heat-exchange tubes connects at least one inlet to at least one outlet so as to convey circulating fluid from the connected inlet through the heat-exchange tube to the connected outlet. In each of the multiple heat-exchanging subunits, the multiple heat-exchange tubes are arranged at least partly within the ambient-fluid passage so as to enable heat transfer between circulating fluid conveyed through the heat-exchange tubes and ambient fluid flowing through the ambient-fluid passage. The multiple heat-exchanging subunits are arranged within the ambient fluid so as to direct flow of the ambient fluid through the ambient-fluid passages of the multiple subunits. A temperature-induced density differential of the ambient fluid, which density differential arises from the heat transfer, drives the flow of the ambient fluid through the ambient-fluid passages.

Each upper heat-exchange assembly comprises an ambient-fluid passage, at least one circulating-fluid inlet, at least one circulating-fluid outlet, and multiple heat-exchange tubes. Each of the multiple heat-exchange tubes connects at least one inlet to at least one outlet so as to convey circulating fluid from the connected inlet through the heat-exchange tube to the connected outlet. The multiple heat-exchange tubes are arranged at least partly within the ambient-fluid passage so as to enable heat transfer between circulating fluid conveyed through the heat-exchange tubes and ambient fluid flowing through the ambient-fluid passage. The ambient-fluid passage is arranged so as to direct flow therethrough of the ambient fluid in a non-horizontal direction. The heat-exchange assembly is arranged so as to drive the flow of the ambient fluid through the ambient-fluid passage by a temperature-induced density differential, which density differential arises from the heat transfer, between the flowing ambient fluid at opposing ends of the ambient-fluid passage. The heat-exchange assembly is immersed in the ambient fluid, which ambient fluid comprises atmospheric air.

The tower or a superstructure supporting upper heat-exchange assemblies can be further arranged to include lighterthan-air buoyant cells for supporting at least a portion of the weight of those structures. Alternatively, the upper and lower heat-exchange assemblies can be positioned on a hill, mountain, or other geographic feature to achieve the desired elevation of the upper heat-exchange assembly above the lower heat-exchange assembly.

The circulating fluid can comprise gas, liquid, or a mixture. If a mixture is employed, the upper heat-exchange assembly can be further arranged to condense gaseous circulating fluid and the lower heat-exchange assembly can be further arranged to boil liquid circulating fluid. If a mixture is employed, the lower heat-exchange assembly or the ascending column can be further arranged to reduce a lapse rate of the circulating fluid by condensation of a fraction of the circulating fluid in the ascending column.

A power-generating system can be further arranged to heat the circulating fluid at the lower heat-exchange assemblies during the day and to cool the circulating fluid at the upper heat-exchange assemblies at night. The power-generating system can be further arranged to store the circulating fluid thus heated or cooled in one or more storage tanks at about the same elevation as the lower and upper heat-exchange assemblies, respectively.

Objects and advantages pertaining to heat-exchange-driven power-generating towers may become apparent upon referring to the exemplary embodiments illustrated in the drawings and disclosed in the following written description or appended claims.

The embodiments shown in the Figures are exemplary, and should not be construed as limiting the scope of the present disclosure or appended claims.

DETAILED DESCRIPTION OF EMBODIMENTS

Figure 1:
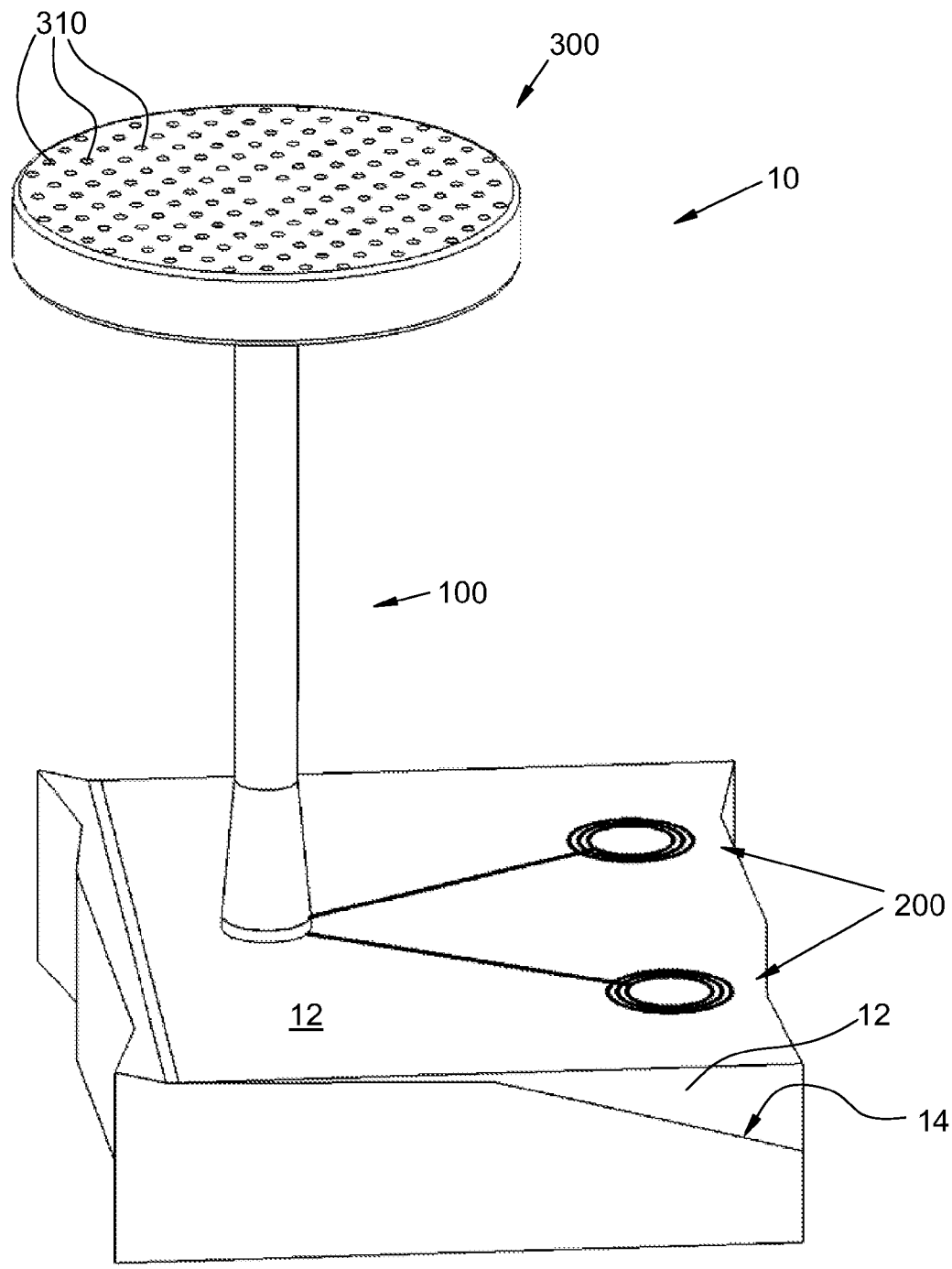
FIG. 1 illustrates schematically an exemplary power-generating tower.
Figure 2:
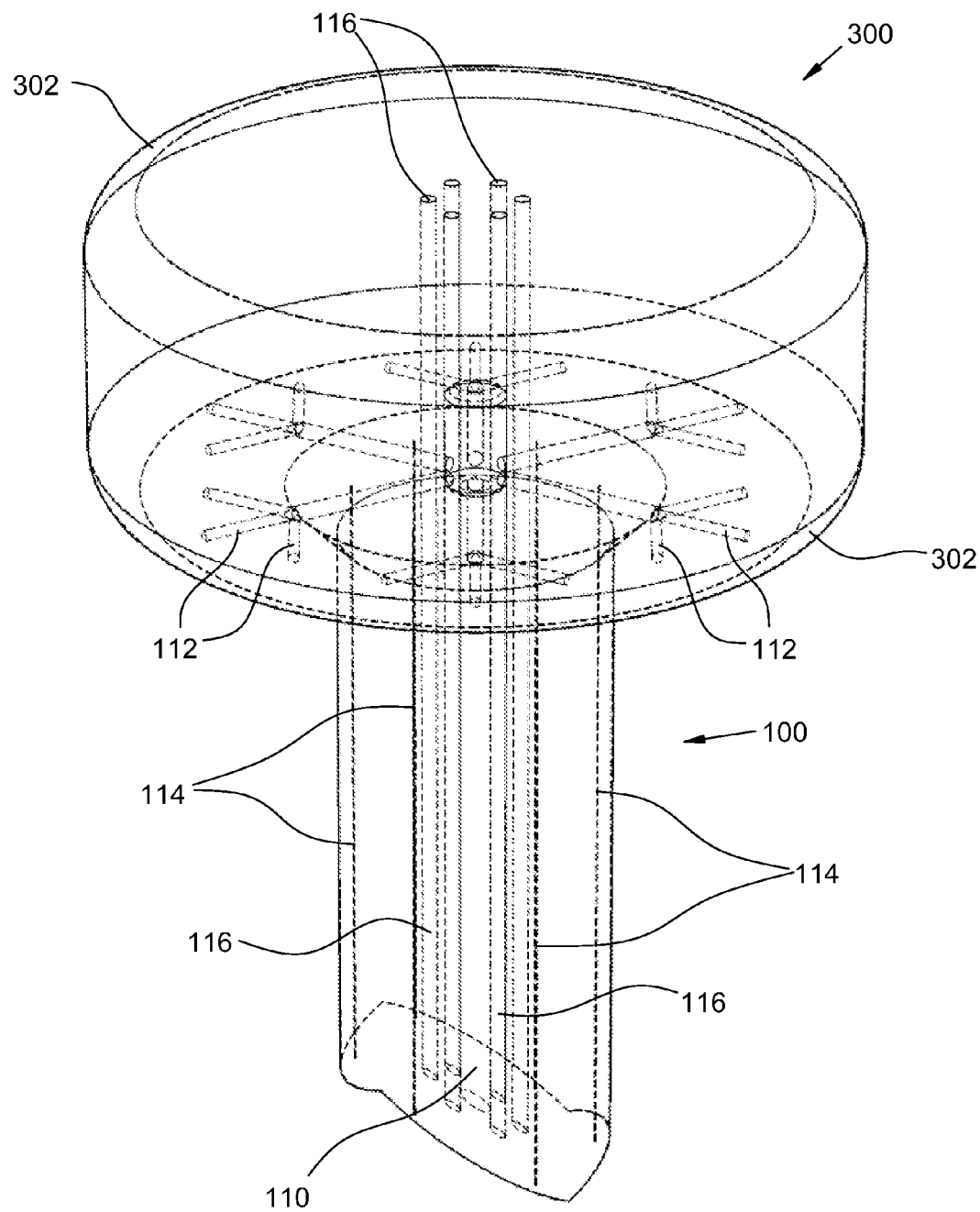
FIG. 2 illustrates schematically exemplary upper heat-exchange assemblies within a support structure.
Figure 3:
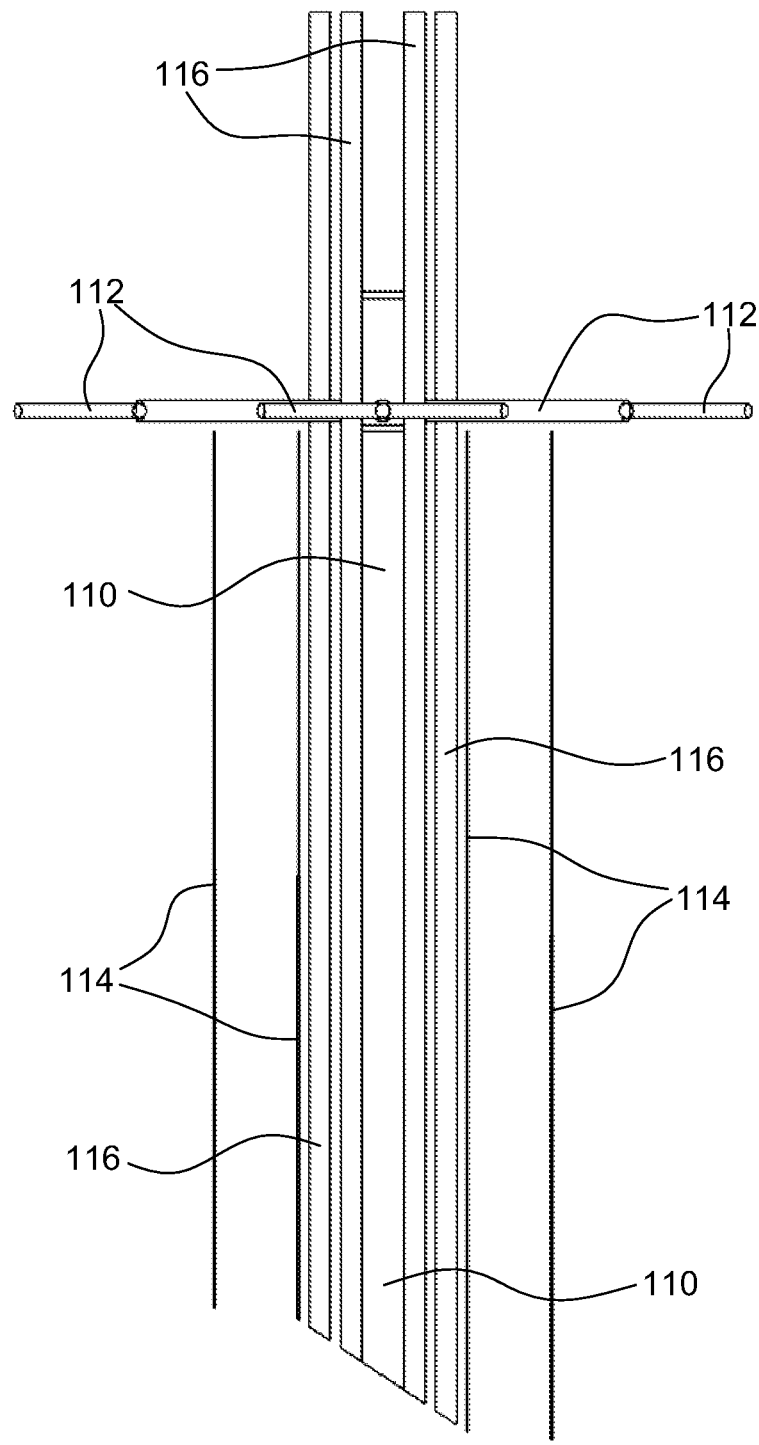
FIGS. 3 and 4 illustrate schematically exemplary circulating-fluid passages that connect upper heat-exchange assemblies to ascending and descending circulating-fluid columns.
Figure 4:
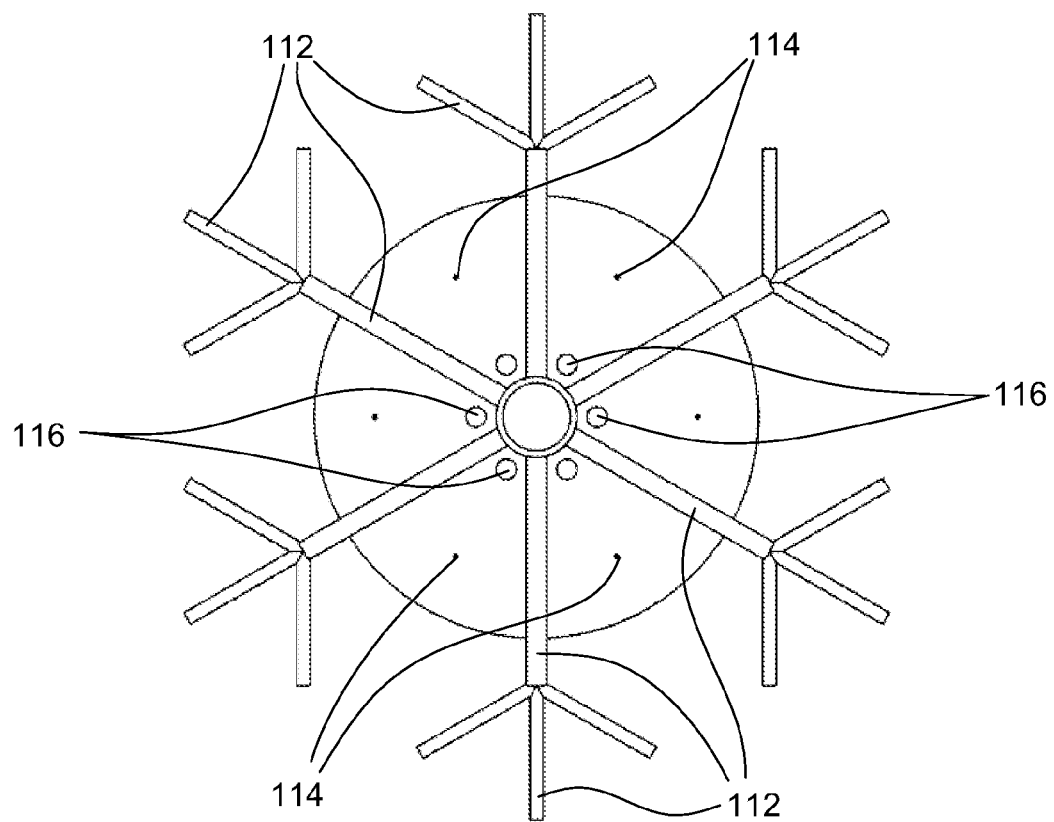

FIG. 1 illustrates schematically an exemplary power-generating tower 10 that comprises at least one lower heat-exchange assembly 200, at least one upper heat-exchange assembly 310, and a tower structure 100 arranged to support each upper heat-exchange assembly 310. The tower structure 100 includes (typically in its interior) at least one ascending circulating-fluid column 110 and at least one descending circulating-fluid column 114 (illustrated schematically in FIGS. 2-4). The power-generating tower 10 also includes at least one turbine. The ascending and descending columns are preferably constructed using materials that are resistant to corrosion by fluid circulating within them, and must be suitably adapted to withstand pressures and temperatures of the circulating fluid that occur during operation of the power-generating tower. This is further discussed below.

Figure 5:
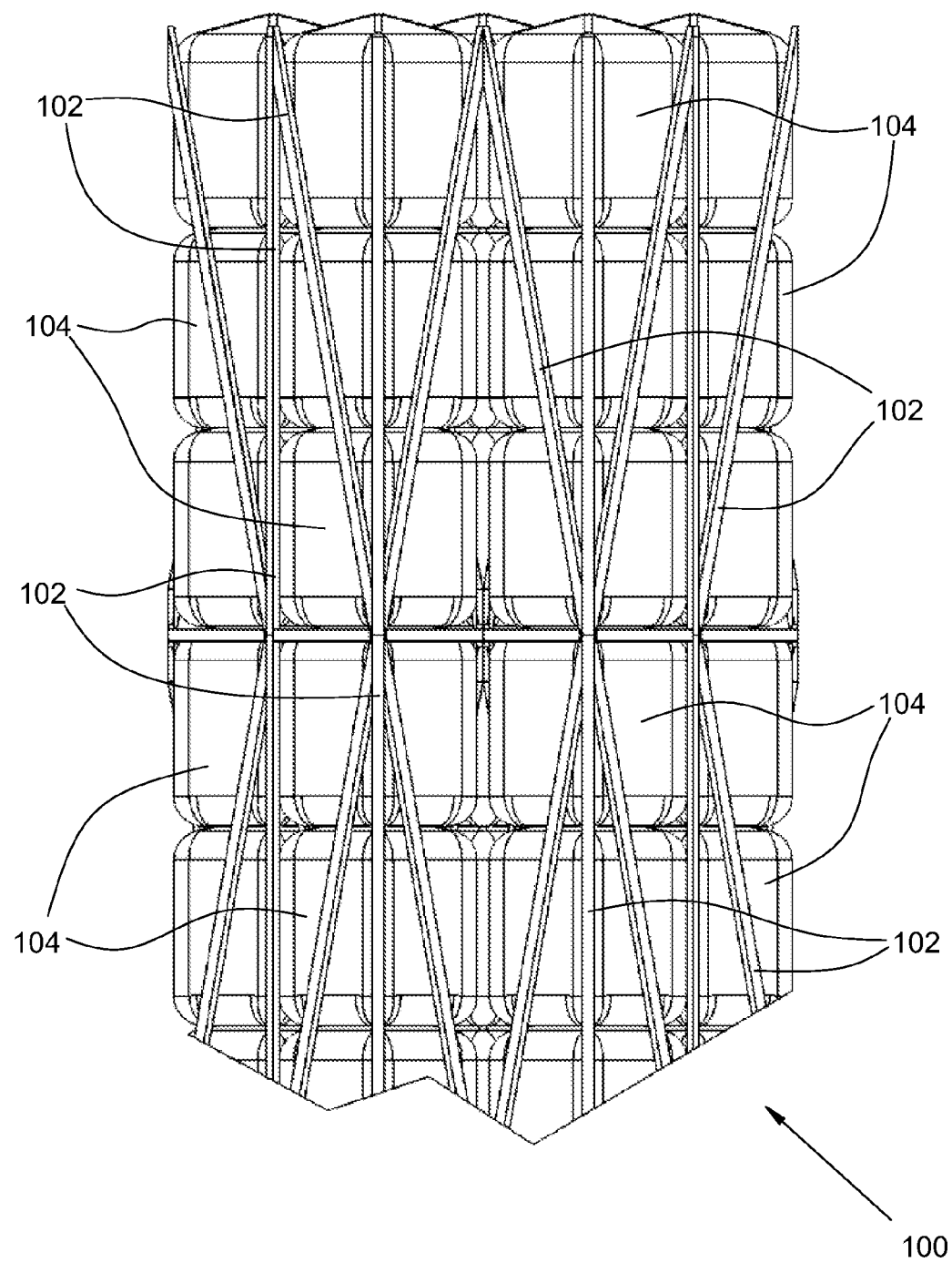
FIGS. 5 and 6 illustrate schematically portions of an exemplary tower support structure.
Figure 6:
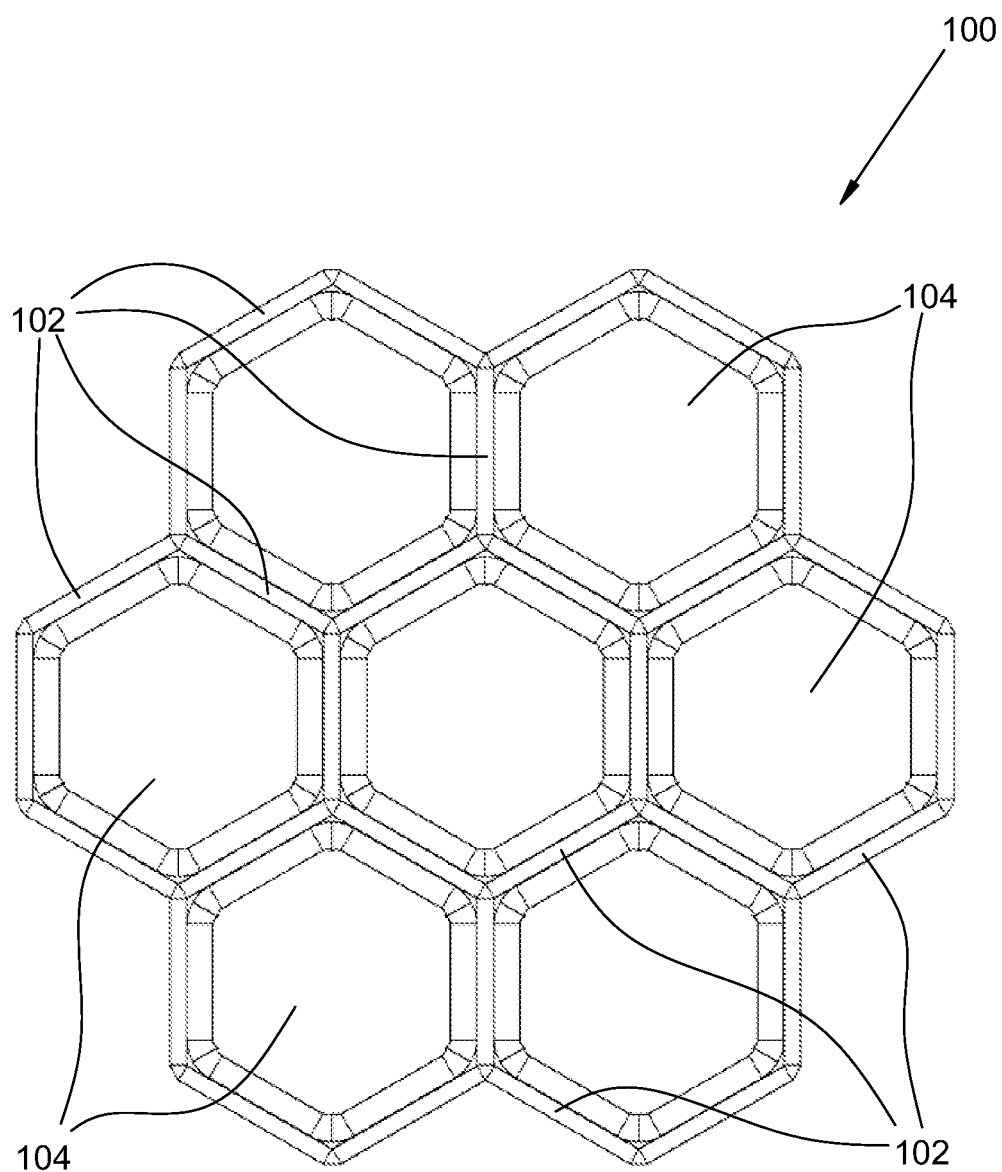

The tower structure can be formed in any suitable way using any suitable materials, arrangements, or construction techniques required for making a tower of the desired height (possibly as tall as several kilometers or tens of kilometers). A suitable foundation is required for supporting the weight of a kilometers-high structure. The foundation also typically contains channels for conveying circulating fluid (under high pressure) to turbines, and for housing the turbines, generators, electrical power lines, and associated equipment. Construction techniques used for foundations of skyscrapers or other very tall buildings (e.g., employing reinforced concrete) can be employed. For towers built in or near a body of water, caissons, hydro-cement, coffer dams, or other similar techniques may be required. The tower itself can include a framework with truss arrangements formed from structural members 102, as illustrated schematically in FIGS. 5 and 6. The structural members can be configured as I-beams, tube trusses, pneumatic or hydraulic struts, or other suitable structural members, and can be formed from steel, aluminum, fiberglass, carbon fiber, or other suitable structural materials. Descending columns for conveying high-pressure circulating fluid can be supported in part by the framework, and can be constructed to support part of their own weight (described further below). To further aid in supporting the weight of the tower structure 100 and any upper heat-exchange assemblies 310 it supports, the tower assembly 100 can include multiple buoyant cells 104, which cells are filled with a suitable lighter-than-air gas (or evacuated). The buoyant cells 104 can be arranged within the tower structure 100 to support at least a portion of its weight, thereby at least partly relieving the load on the tower structure itself.

Multiple upper heat-exchange assemblies 310 can be arranged within a framework or superstructure 300 supported by the tower structure 100. If needed or desired, additional buoyant cells (not shown; evacuated or filled with a suitable lighter-than-air gas) can be arranged among the upper heat-exchange assemblies 310 within the superstructure 300 to support at least a portion of the weight of superstructure 300 and upper heat-exchange assemblies 310. Any suitable lighter-than-air gas can be employed. If a lighter-than-air gas is used as the circulating fluid (or a component of a circulating fluid mixture), that gas might be a convenient choice as a gas to fill the buoyant cells. For example, if ammonia is used as the circulating fluid, gaseous ammonia can be employed as the lighter-than-air gas used to fill the buoyant cells. The tower structure 100 can include any pumps, valves, or plumbing required for filling or maintaining the fill of the buoyancy cells.

Figure 21:
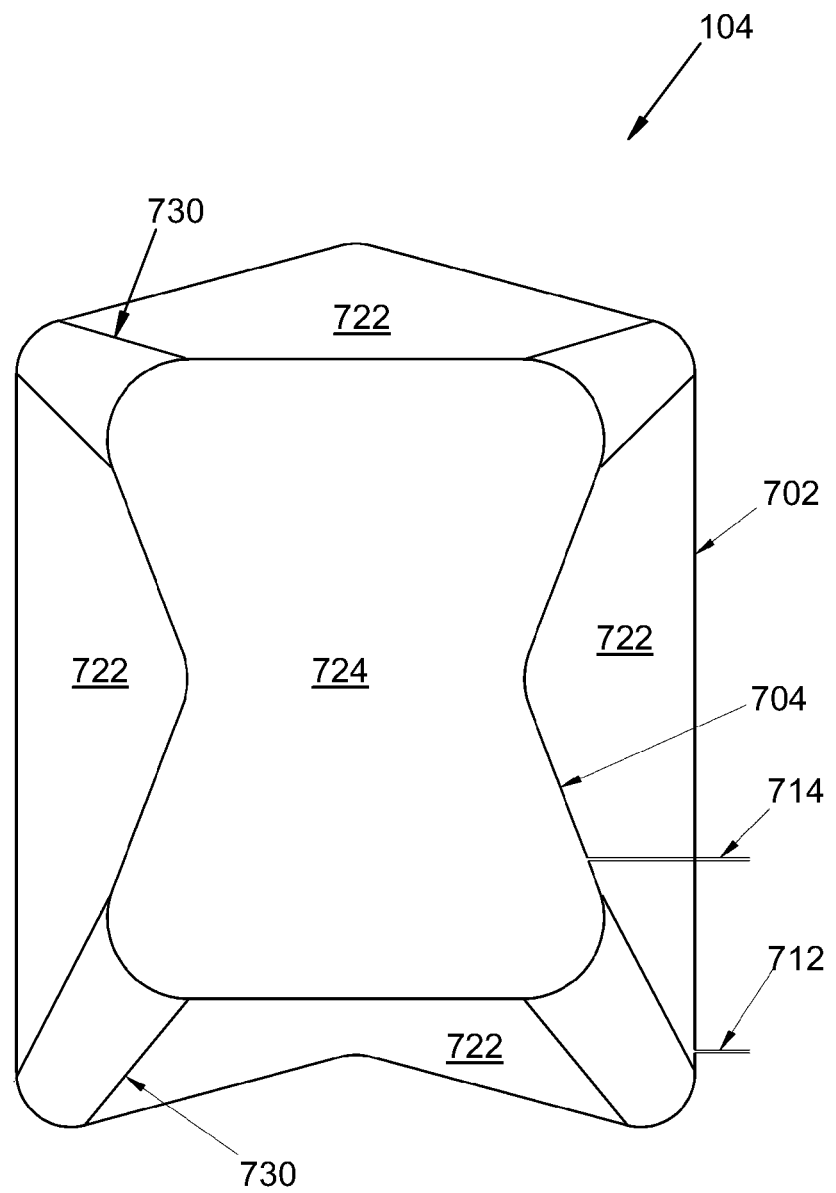
FIG. 21 illustrates schematically an exemplary buoyancy cell.

Simple single-walled buoyancy cells 104 can be employed. Alternatively, double-walled buoyancy cells can be employed. An exemplary buoyancy cell 104 shown in FIG. 21 that comprises an outer skin 702 and an inner skin 704 that forms a ballonet 724 within the buoyancy cell 104. One or more tethers or stabilizing lines 730 can be employed to hold ballonet 724 in position within buoyancy cell 104. The ballonet 724 can be filled, e.g., with hydrogen, while the outer volume 722 (between the inner skin 704 and the outer skin 702) can be filled with another, less flammable lighter-than-air gas, e.g., ammonia as in the example of the previous paragraph. Any pair of suitable lighter-than air gases or gas mixtures can be employed, with the lighter gas typically filling the ballonet 724. Feed lines 712 and 714 enable lighter-than-air gasses to be introduced into outer volume 722 and ballonet 724, respectively, and can also enable processing of those gases, e.g., to remove ambient air or ballonet gas that diffuses into outer volume 722 through skins 702 and 704, respectively.

The use of buoyancy cells 104 that includes ballonets 724 can provide additional buoyancy, thereby increasing their lifting power, which in turn can provide various advantages, e.g., (i) enabling use of stronger and heavier materials to construct tower structure 100, (ii) supporting a larger and heavier assembly of upper heat-exchange assemblies 310, or (iii) enabling construction of a higher tower structure 100. Ballonets 724 can mitigate various disadvantages associated with the user of certain lighter-than-air gasses. For example, hydrogen is known to cause enbrittlement of various metals, including high strength steels. Confining hydrogen gas within a ballonet places two barriers (inner and outer skins 702 and 704) between the hydrogen gas and the tower structural members 102 or the superstructure 300. Hydrogen is highly diffusive and would typically leak quickly from a single-skinned buoyancy cell. Leakage from a buoyancy cell wherein the hydrogen is confined within a ballonet 724 is correspondingly slower; the hydrogen must diffuse through two barriers, and the hydrogen concentration in outer volume 722 would be substantially lower than that within ballonet 724. Hydrogen is extremely flammable, but substantially eliminating oxygen from outer volume 722 also significantly reduces the risk of igniting the hydrogen confined within ballonet 724.

A hexagonal arrangement of tower structure 100 and its components is shown in the exemplary structure illustrated schematically in FIGS. 2-6. However, any other suitable arrangement or geometry can be employed. Materials typically employed for constructing large structures (such as bridges or skyscrapers) can be employed for constructing tower structure 100. Such materials can include, but are not limited to, steel, aluminum, titanium, various metal alloys, concrete, reinforced concrete, composite materials, carbon fibers, fiberglass, other natural or synthetic fibers, polymeric resins, polymer matrix materials, and so forth.

The tower structure 100 will typically include an outer skin to shield its interior components (ascending and descending columns, buoyancy cells, structural members, and so on) from the elements or to reduce wind loading. Such an outer skin can be formed in a manner similar to an aircraft skin, for example using materials such as aluminum, fiberglass, or other fiber composite. Fixed or movable structures such as flaps, fins, ailerons, blowers, and so forth (not shown) can be arranged on the tower to provide passive reduction or active control of wind loading.

Figure 7:
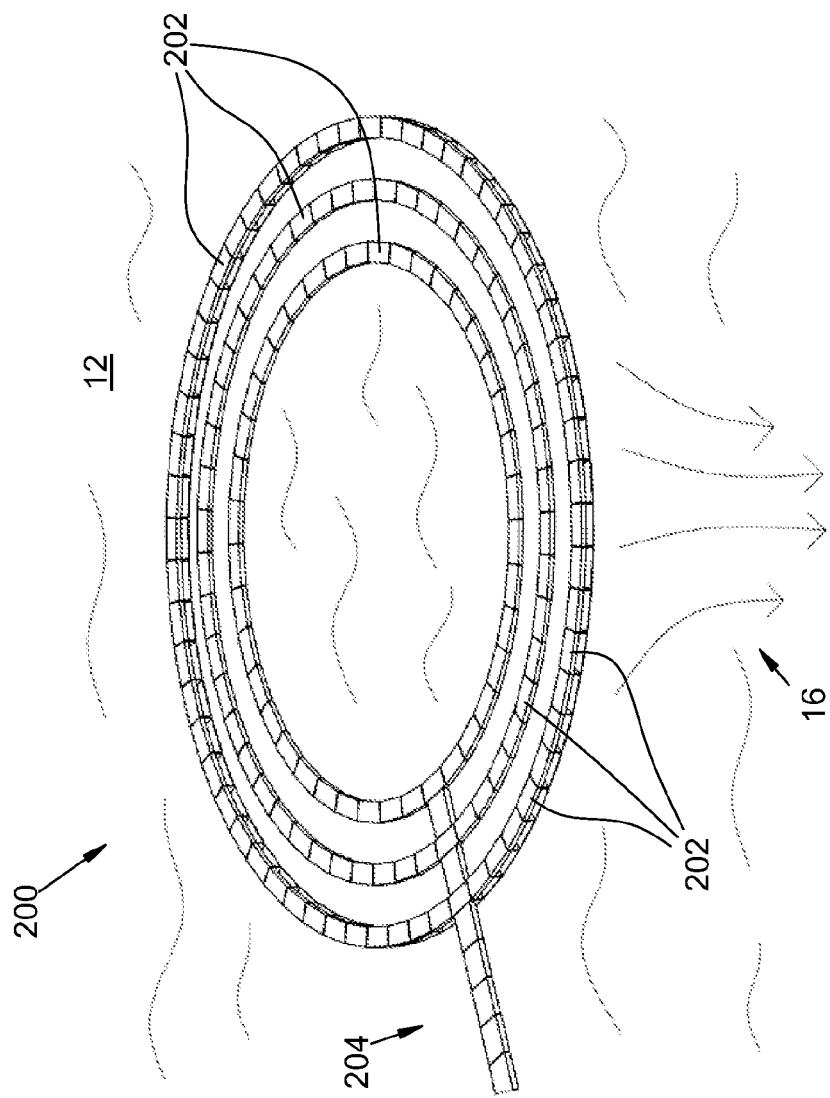
FIG. 7 illustrates schematically an exemplary lower heat-exchange assembly comprising multiple lower heat-exchanging subunits.

Each lower heat-exchange assembly 200 comprises multiple lower heat-exchanging subunits 202, as illustrated schematically in FIG. 7. Each of the heat-exchanging subunits 202 (illustrated schematically in FIGS. 8-10) comprises a lower ambient-fluid passage (indicated by arrows 220), at least one lower circulating-fluid inlet 212, at least one lower circulating-fluid outlet 210, multiple circulating-fluid tubes 208, and multiple lower heat-exchange tubes 206. The lower ambient-fluid passage in this example is defined by the top, bottom, and side surfaces of the subunit 202, but can be arranged or defined in any other suitable way. Each circulating fluid tube 208 connects at least one lower inlet 212 to multiple heat exchange tubes 206. Each of the multiple lower heat-exchange tubes 206 connects at least one circulating-fluid tube 208 to at least one lower outlet 210. Circulating fluid (from the descending column 114) enters the heat-exchanging subunit 202 through inlets 212 to circulating-fluid tubes 208, which convey the fluid toward the bottom of subunit 202. The circulating fluid then enters heat-exchange tubes 206, where a majority of the heat is absorbed as it flows toward the top of the subunit 202. Alternatively, the lower circulating-fluid inlets can be arranged at the bottom of the subunit 212 and connected directly to the multiple heat-exchange tubes 206, eliminating the need for tubes 208. The heated circulating fluid is collected from the heat-exchange tubes 206 into the outlets 210 and conveyed to the ascending column 110. The multiple lower heat-exchange tubes 206 (only some of which are shown in the figures) are arranged at least partly within the lower ambient-fluid passage to enable heat transfer from lower ambient fluid flowing through the lower ambient-fluid passage to circulating fluid conveyed through the lower heat-exchange tubes 206.

In the example of FIG. 7, the multiple lower heat-exchanging subunits 202 are arranged in at least one ring (three concentric rings in each assembly in the example shown) and direct flow of the lower ambient fluid through the lower ambient-fluid passages in a primarily radial direction relative to the ring. Each such ring of multiple lower heat-exchanging subunits 202 is arranged substantially horizontally within the lower ambient fluid so that a temperature-induced density differential of the lower ambient fluid (that arises from the heat transfer to the circulating fluid) drives the flow of the lower ambient fluid through the lower ambient-fluid passages 220. The lower heat-exchange assembly will be described further below.

Each upper heat-exchange assembly 310 comprises an upper ambient-fluid passage 312, at least one upper circulating-fluid inlet 322, at least one upper circulating-fluid outlet 324, and multiple upper heat-exchange tubes 330. Each of the multiple upper heat-exchange tubes 330 connects at least one upper inlet 322 to at least one upper outlet 324 so as to convey the circulating fluid from the connected upper inlet 322 through the upper heat-exchange tube 330 to the connected upper outlet 324. The multiple upper heat-exchange tubes 330 (only some of which are shown) are arranged at least partly within the upper ambient-fluid passage 312 to enable heat transfer from the circulating fluid conveyed through the upper heat-exchange tubes 330 to upper ambient fluid flowing through the upper ambient-fluid passage 312. The tubes can be provided with transverse plates, for structural support or to act as heat "fins" to facilitate transfer of heat from the heat-exchange tubes 330 to the ambient fluid flowing around the heat-exchange tubes 330 within upper ambient-fluid passage 312. The upper ambient-fluid passage 312 is arranged so as to direct flow therethrough of the upper ambient fluid in a non-horizontal direction (substantially vertical in the exemplary embodiment). Flow of the upper ambient fluid upward through the upper ambient-fluid passage 312 is driven by a temperature-induced density differential (that arises from the heat transfer from the circulating fluid) between the upper ambient fluid at opposing ends of the upper ambient-fluid passage 312. The upper heat-exchange assemblies 310 are immersed in the upper ambient fluid, typically atmospheric air.

Each ascending column 110 is arranged and connected to receive the circulating fluid from at least one of the lower heat-exchange assemblies 200 and to convey the circulating fluid thus received upward and into at least one of the upper heat-exchange assemblies 310. The ascending column can be connected to the upper heat-exchange assemblies by branches 112 of the ascending column 110. The branches 112 connect to the inlets 322 of the upper heat-exchange assemblies 310. Each descending column is arranged and connected to receive the circulating fluid from at least one of the upper heat-exchange assemblies 310 from outlets 324 and to convey the circulating fluid thus received downward and into at least one of the lower heat-exchange assemblies 200.

The circulating fluid in the power-generating tower can comprise liquid, gas, or both. When both liquid and gas are present, the tower can be referred to as a phase-changing tower. Whether liquid, gas, or both, flow of the circulating fluid is driven by density variations that arise as the fluid is heated or cooled by passage through the lower and upper heat-exchange assemblies, respectively. In typical operation, the circulating fluid draws heat from the lower ambient fluid as they each flow through the lower heat-exchange assembly 200. The density of the circulating fluid decreases upon heating and rises through the ascending column 110 of the tower structure 100. In a phase-changing cycle, the circulating fluid is boiled in the lower heat-exchange assembly 200 and rises as vapor through the ascending column 110. The circulating fluid sheds heat into the upper ambient fluid (atmospheric air, often one, several, or tens of kilometers above the lower heat exchange assembly 200) as they each flow through the upper heat exchange assemblies 310 arranged in superstructure 300. The density of the circulating fluid thus cooled increases and the dense circulating fluid flows downward through descending columns 114 of the tower structure 100. In a phase-changing cycle, the circulating fluid is condensed in the upper heat-exchange assemblies 310 and flows as liquid through the descending columns 114. The dense circulating fluid flows back to the lower heat-exchange assembly and the cycle is repeated.

At some point in the cycle the flowing circulating fluid drives one or more turbines 400, which enables mechanical power to be extracted from the cycle. In an all-gas or all-liquid cycle, the turbine can be placed at any convenient point in the cycle. In a phase-changing cycle, the turbine can be advantageously located between the descending column 114 and the lower heat-exchange assembly 200. With that placement, the pressure drop of the circulating fluid, as it flows through and drives the turbine, enables the circulating fluid to boil more readily in the lower heat-exchange assembly. The turbines can be arranged to enable specific control over the pressure of the boiling circulating fluid. An exemplary arrangement of turbines 400 at the base of descending columns 114 and connected to lower circulating-fluid inlets 212 is illustrated schematically in FIG. 17; any suitable number or arrangement of turbines can be employed. The mechanical power extracted by the turbine can be used directly, or more typically can be used to drive electrical generators to generate electrical power that can be transmitted away from the power-generating tower and used elsewhere. Any suitable turbine or generator arrangement (currently known or later developed) can be employed within the scope of the present disclosure or appended claims. Fluid-driven turbines and electrical generators are well-known, and the principles of their operation or optimization need not be repeated here.

Many different circulating fluids can be employed in the density-driven cycle. In an all-gas cycle, air or other inert gas can be employed. Examples of circulating fluids suitable for an all-liquid cycle include, but are not limited to, water, salt water, water-ammonia (water-rich), water-alcohol, or water-glycol. Examples of circulating fluids suitable for a phase-changing cycle include, but are not limited to, ammonia, water-ammonia (ammonia-rich), hydrocarbon-ammonia. In some instances, a phase-changing cycle employing both liquid and gas as the circulating fluid may be preferred for large-scale power generation, as described further below.

Materials comprising the ascending column and its branches, descending columns, inlets, outlets, and heat-exchange tubes (or at least the surfaces of those components that are in contact with the circulating fluid) are typically chosen to be compatible with the chosen circulating fluid. For example, if ammonia is a component of the circulating fluid, then aluminum, certain stainless steels, or most plastics would be suitable choices because typically they are not corroded by ammonia. Any materials (currently known or later developed) can be chosen based on compatibility with the chosen circulating fluid. Structurally, the descending columns in particular must withstand significant pressure loads from the (in some cases) kilometers-high column of circulating fluid they contain. A kilometer-high descending column filled with liquid ammonia, for example, may require meter-thick steel walls, for example. One example of an advantageous arrangement for the descending columns can include hollow, tapered steel columns (lined with plastic or stainless steel to prevent corrosion from circulating ammonia); the tapered arrangement can enable such a column to contain the pressure of the circulating fluid and also support its own weight (thereby relieving the tower structure of that load). Placement of multiple such tapered columns around the periphery of the tower structure (as in FIGS. 2-4) can stiffen it against lateral loads (e.g., wind loading). Other suitable structures or arrangements of the descending columns can be employed within the scope of the present disclosure or appended claims.

Figure 11:
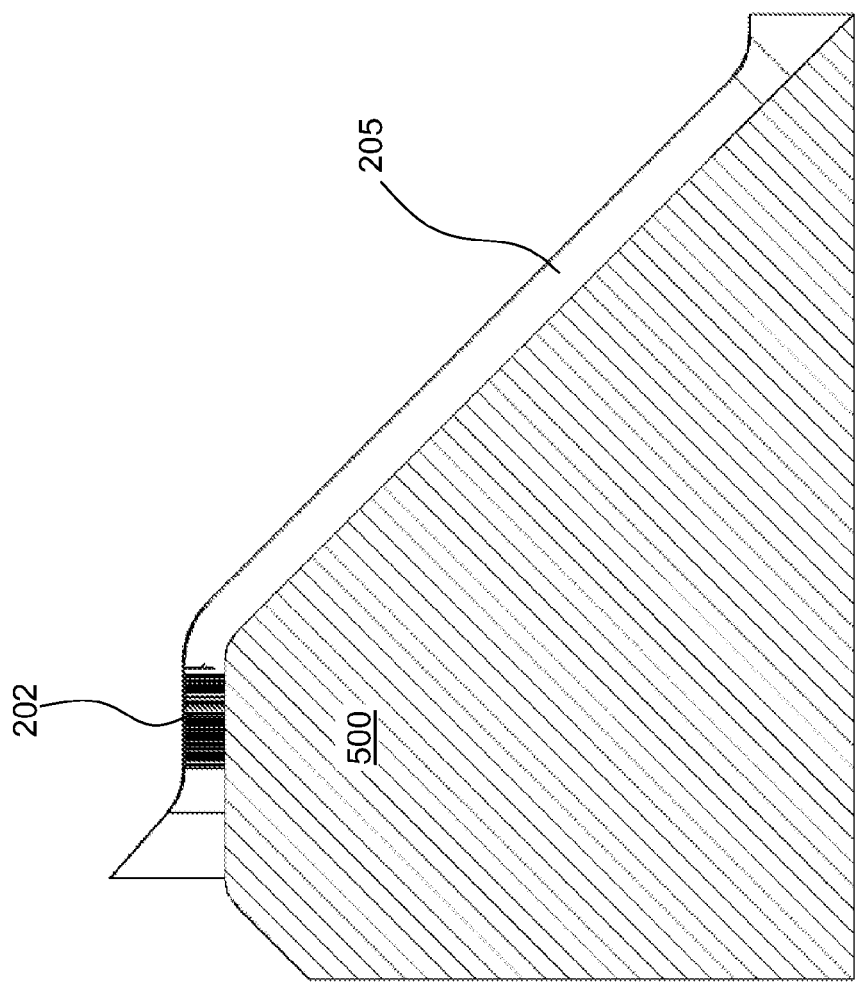
FIG. 11 illustrates schematically an exemplary lower heat-exchanging subunit positioned on a hill.
Figure 12:
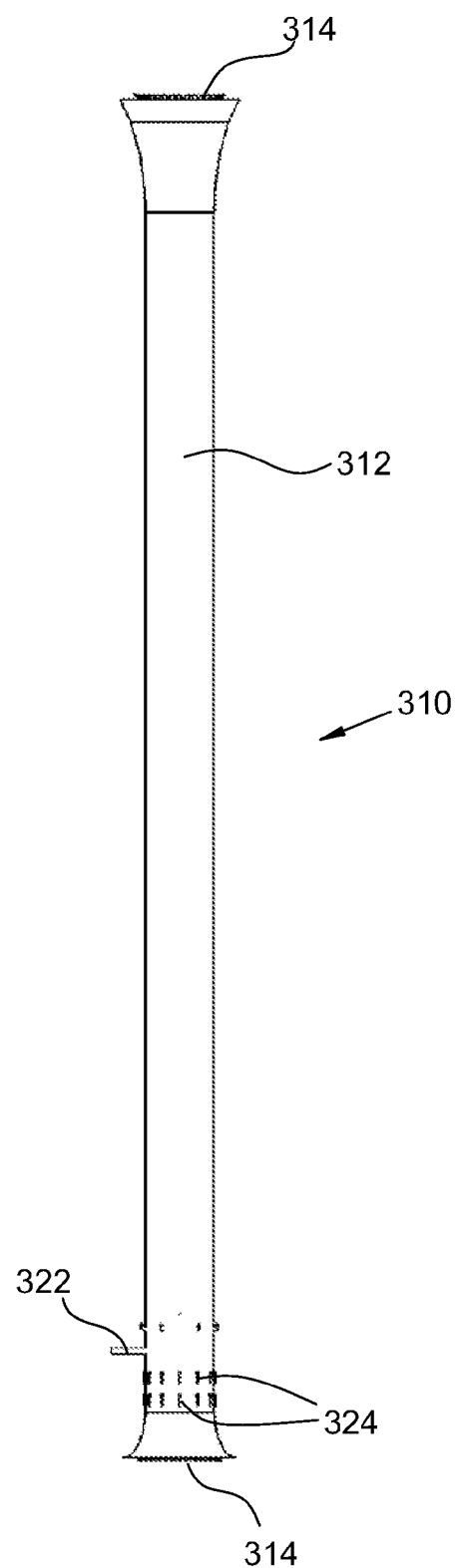
FIGS. 12-16 illustrate schematically an exemplary upper heat-exchange assembly.
Figure 13:
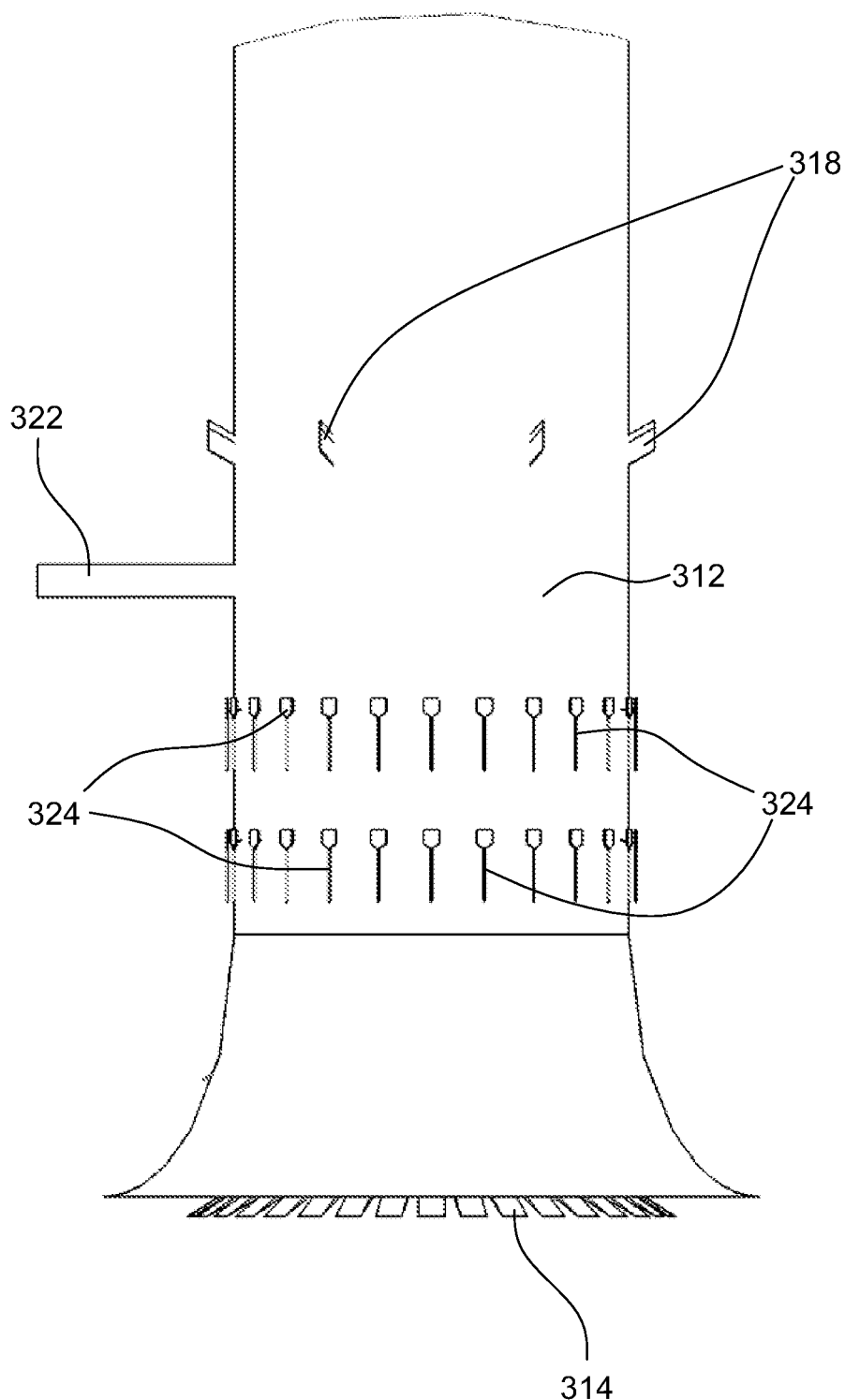
Figure 14:
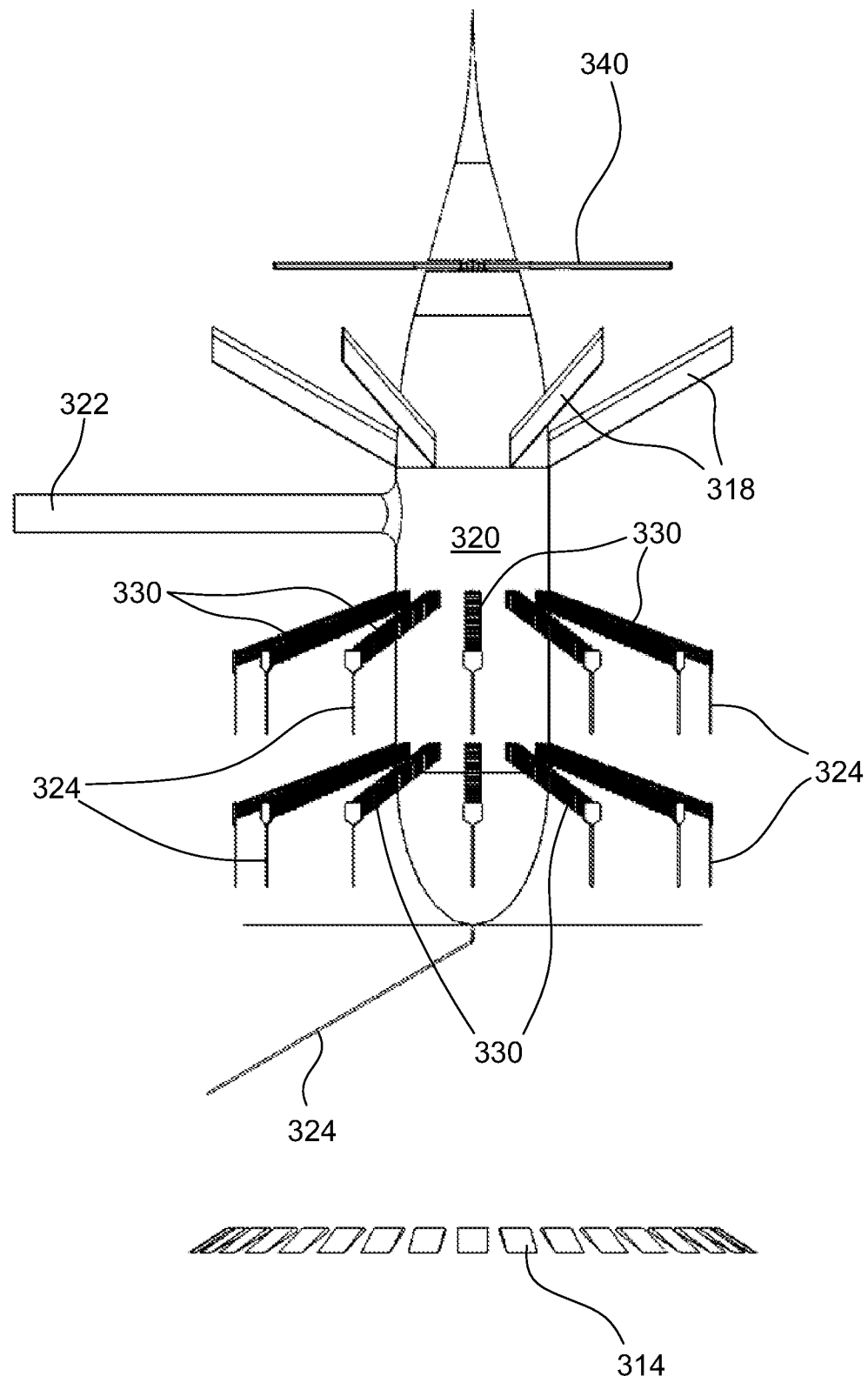
Figure 15:
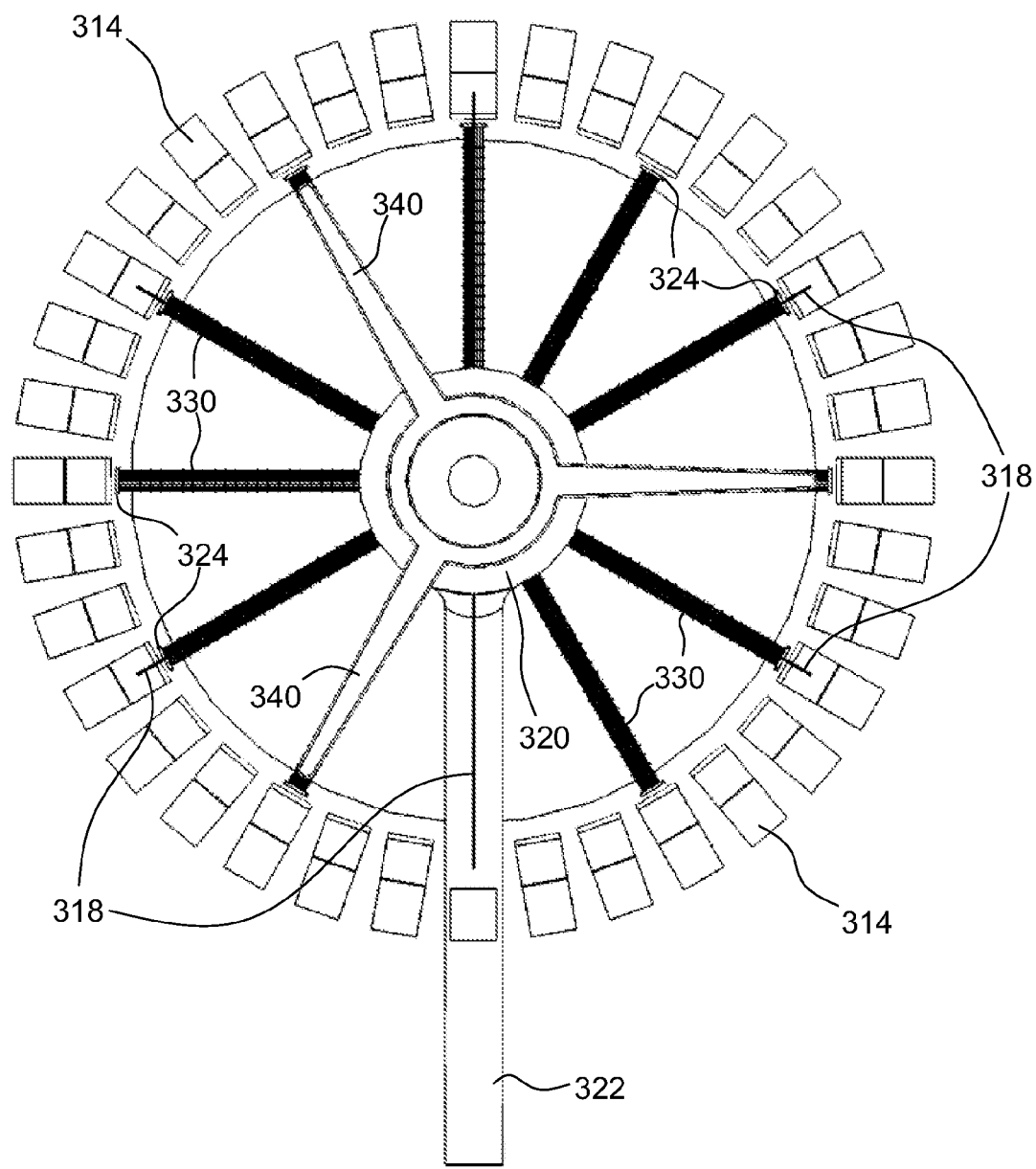
Figure 16:
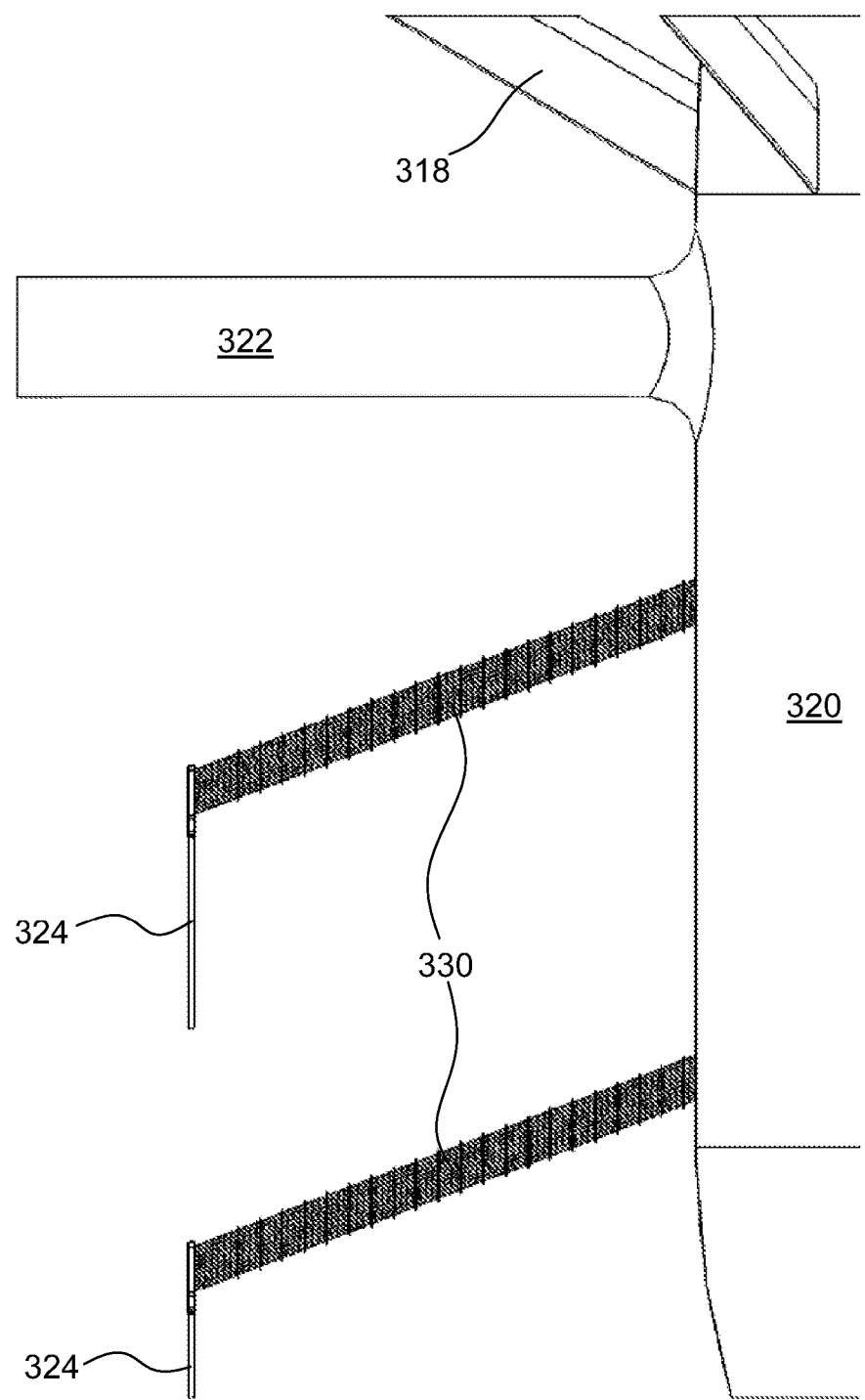

In a land-based power-generating tower, the lower heat-exchanging subunits 202 are immersed in atmospheric air and can be arranged on an area of terrain that is elevated relative to an adjacent surrounding area of terrain (as in the schematic partial cross section of FIG. 11, showing one subunit 202 and an ambient air passage 205 on a hill 500). The elevated area can be a natural feature such as a hill, or can be an artificially created mound constructed for the purpose. As the circulating fluid draws heat from the ambient air in the lower heat-exchange assembly 200, the cooled ambient air becomes denser and tends to flow downhill, away from the lower heat-exchange assembly 200. Warm air is drawn from above the heat-exchange assembly 200 and through the heat-exchanging subunits 202 by that downward flow. The density-driven flow of warmer ambient air from above the heat-exchange assembly 200 through the ambient-fluid passages (indicated by arrows 220) of the multiple heat-exchanging subunits 202 continuously supplies heat to the circulating fluid flowing through the heat-exchange tubes 206 of the subunits 202. The heat-exchanging subunits 202 can be arranged in one or more curvilinear rows along a hillside, ridgeline, or escarpment. Each such row can be arranged along an elevation contour, but this need not be the case. When multiple rows are employed they can be arranged "in series" (i.e., one above the next with ambient air flow out of one row being drawn into the next) or "back-to-back" (i.e., on opposite sides of a high point of the terrain with ambient airflow downward between the rows and outward through each row). Instead of rows, the heat-exchanging subunits can be arranged in a ring (or multiple concentric rings) on a hilltop or ridge. Downhill flow of ambient air cooled in the heat-exchanging subunits 202 is directed radially outward through the ring, drawing warm ambient air from above the ring into its interior. In any of those exemplary arrangements (rows or rings), the placement of the heat-exchange assembly 200 on an elevated area results in the described fluid density-driven flow of ambient air through the ambient-fluid passages of the subunits 202 without the need for fans, turbines, pumps, or similar devices to drive the ambient air flow. Such devices can be employed, if needed or desired, to initiate or enhance the ambient air flow. Such devices can be driven using power generated by the power-generating tower, but such power consumption must be limited in order to avoid undue decrease in the net power output of the tower. Alternatively, turbines 213 can be employed to extract additional energy from the flow of ambient air through the subunit 202. Such turbines can be of any suitable type and can be coupled in any suitable way for using power thus extracted (e.g., by coupling turbine 213 to an electric power generator).

In an alternative arrangement of a land-based power-generating tower, the lower heat-exchange assembly 200 and its heat-exchanging subunits 202 can be mounted on the tower structure 100 at a sufficient height to enable downward density-driven flow of cooled ambient air through the heat-exchanging units 202. Such an arrangement can enable construction of a power-generating tower on a much smaller area of land in a wider variety of landscapes (because no elevated terrain is required). The local cooling effect of the ambient air flow would be decreased by the height of the heat-exchanging subunits 202. If the turbines 400 (driven by flow of the circulating fluid) are positioned below the lower heat-exchange assembly 200, then the descending columns 114 and ascending columns 112 are preferably arranged so that there is sufficient pressure after the turbines 400 to drive flow of the circulating fluid up to the height of the lower heat-exchange assembly 200.

In a water-based power-generating tower, the lower heat-exchanging subunits 202 can be arranged in a ring, immersed in lake water or, preferably, seawater and positioned substantially horizontally at or near the surface of the lake water or seawater. As the circulating fluid draws heat from the lake water or seawater surrounding the heat-exchange assembly 200, the cooled water becomes denser and tends to sink. Warmer surface water is drawn from around the rings of subunits 202, radially inward through the ambient-fluid passages, and into the interior of the ring by this downward flow of cooled water. This density-driven flow of warmer water from around the ring radially inward through the multiple heat-exchanging subunits 202 continuously supplies heat to the circulating fluid flowing through the heat-exchange tubes 206 of the subunits 202. The placement of the rings of subunits 202 near the surface of the water results in the described density-driven flow of water radially inward through the ambient-fluid passages of the subunits 202 without the need for pumps, propellers, impellers, turbines, or similar devices to drive the ambient water flow. Such devices can be employed, if needed or desired, to initiate or enhance the ambient water flow. Such devices can be driven using power generated by the power-generating tower, but such power consumption must be limited in order to avoid undue decrease in the net power output of the tower. Alternatively, turbines 213 can be employed to extract additional energy from the flow of water through the subunit 202. Such turbines can be of any suitable type and can be coupled in any suitable way for using power thus extracted (e.g., by coupling turbine 213 to an electric power generator). When deployed in a natural body of water, debris screen 203 can be employed to prevent debris or foreign bodies from entering the ambient fluid passage of subunit 202.

In an alternative arrangement, the lower heat-exchange assembly 200 can be deployed in a river or other naturally flowing body of water. The heat-exchanging subunits 202 typically would be arranged in one or more rows across at least a portion of the span of the river. The flow of the river provides the ambient fluid flow through passages 220. Turbines 213 can be employed to extract additional energy from the flow of river water through the subunit 202.

The upper heat-exchange assemblies 310 and their support superstructure 300 can be supported by the tower 100 and any height that provides a temperature differential (between the ascending fluid and the ambient air at the top of the tower) sufficient to draw enough heat from the ascending fluid. If a phase-changing cycle is employed, sufficient heat must be drawn from the ascending circulating fluid to condense it, and the temperature of the ambient air must be lower than the circulating fluid boiling point. To condense gaseous ammonia, the tower structure 100 typically supports the upper heat-exchange assemblies 310 and their support superstructure 300 several kilometers (e.g., about five kilometers) above the lower heat-exchange assembly 200. Much greater heights might be desirable for dissipating larger amounts of heat from the circulating fluid. Alternatively, lesser heights can be employed to reduce size or cost, but can require additional adaptations to provide adequate or desirable levels of power generation (see below).

A power-generating method comprises: (i) transferring heat from lower ambient fluid to a circulating fluid in at least one lower heat-exchange assembly 200; (ii) conveying the circulating fluid from each lower heat-exchange assembly 200 upward through at least one ascending column 110 in a tower structure 100 to at least one upper heat-exchange assembly 310 supported by the tower structure 100; (iii) transferring heat from the circulating fluid to upper ambient fluid in each upper heat-exchange assembly 310; (iv) conveying the circulating fluid from each upper heat-exchange assembly 310 downward through at least one descending column 114 in the tower structure 100; and (v) driving at least one turbine with flow of the circulating fluid. Examples of suitable circulating fluid, upper ambient fluid, and lower ambient fluid are given above. The upper and lower heat-exchange assemblies are briefly described above, and are described in more detail below.

Each heat-exchange assembly 200 comprises multiple heat-exchanging subunits 202 arranged in at least one row or ring. The subunits can be arranged in multiple roughly parallel curvilinear rows or multiple somewhat concentric rings, if desired (three substantially concentric rings are shown in the examples in FIGS. 1 and 7). Each heat-exchanging subunit 202 comprises an ambient-fluid passage (indicated by arrows 220), at least one circulating-fluid inlet 212, at least one circulating-fluid outlet 210, and multiple heat-exchange tubes 206. Each of the multiple heat-exchange tubes 206 connects, directly or indirectly via tubes 208, at least one inlet 212 to at least one outlet 210. Each heat-exchange tube 206 thus conveys circulating fluid from the connected inlet 212 through the heat-exchange tube 206 to the connected outlet 210. In each multiple heat-exchanging subunit 202, multiple heat-exchange tubes 206 are arranged at least partly within the ambient-fluid passage so as to enable heat transfer between circulating fluid conveyed through the heat-exchange tubes 206 and ambient fluid flowing through the ambient-fluid passage 220. If arranged in a ring, the subunits 202 are arranged in the ring to direct flow of the ambient fluid through the ambient-fluid passages in a primarily radial direction relative to the ring. If arranged in a row, the subunits 202 are arranged in the row to direct flow of the ambient fluid through the ambient-fluid passages in a primarily transverse direction relative to the row. Each ring or row of heat-exchanging subunits 202 is arranged within the ambient fluid so that a temperature-induced density differential of the ambient fluid (that arises from the heat transfer between the ambient and circulating fluids) drives the flow of the ambient fluid through the ambient-fluid passages.

Figure 17:
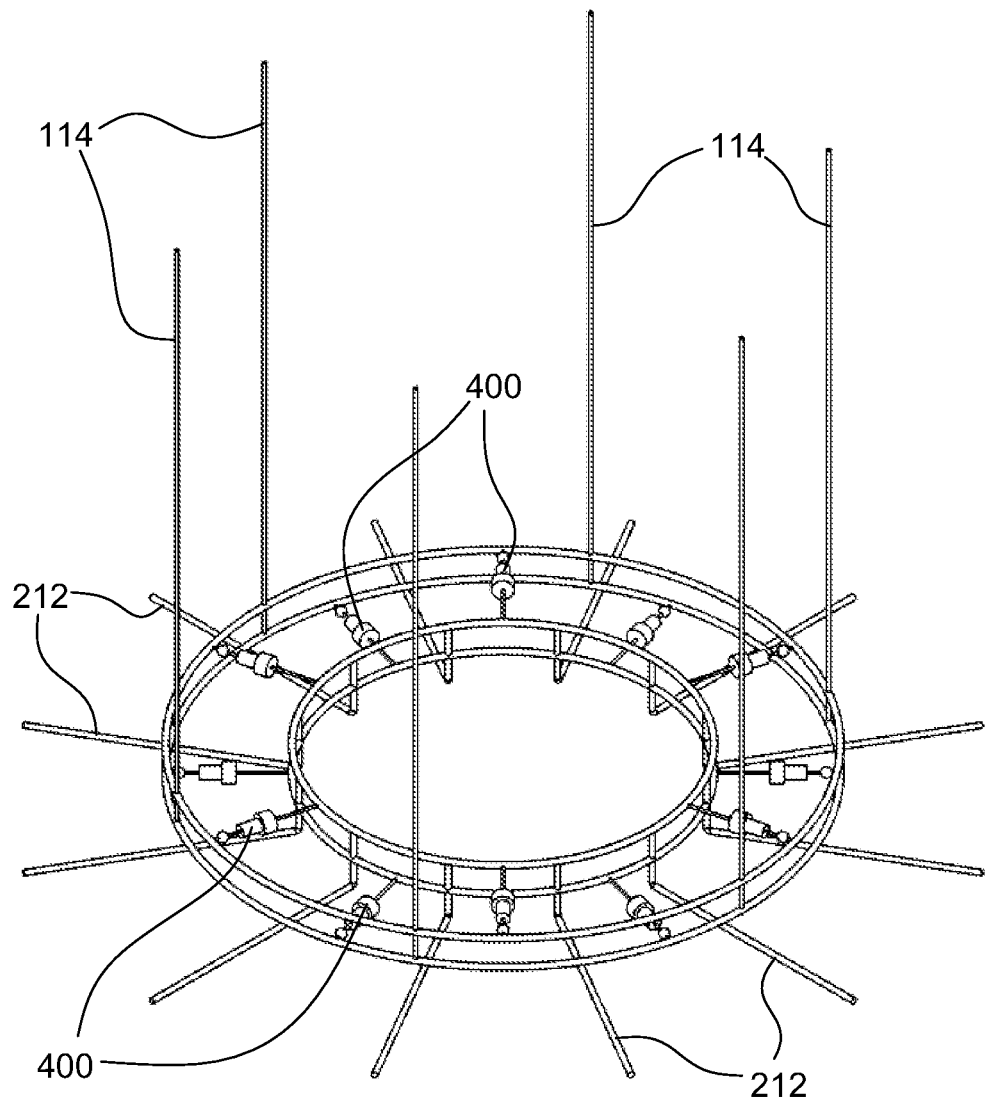
FIG. 17 illustrates schematically an exemplary arrangement of turbines and descending fluid columns.

One suitable arrangement of a heat-exchanging subunit 202 is shown in FIG. 7. Multiple inlets 212 and outlets 210 convey circulating fluid to or from the heat-exchange tubes 206. Any suitable arrangement of connection can be employed, for example a manifold or plenum connecting an inlet 212 or an outlet 210 to some or all of the heat-exchange tubes 206 (e.g., tubes connecting inlets 212 and heat-exchange tubes 206). Similar structures or arrangements can be employed for providing connections between the descending columns 114 and inlets 212 or between outlets 210 and ascending column 110. Each subunit 202 can be connected individually to the ascending and descending columns, or several subunits can be connected "in series," with circulating fluid flowing to/from one subunit through one or more intervening subunits. Any suitable plumbing arrangement can be employed for conveying the circulating fluid from the descending column, through the heat-exchanging subunits, and to the ascending column. If a phase-changing cycle is employed, at least one turbine 400 is typically installed between the descending column 114 and the inlets 212 (FIG. 17). If a sufficient temperature differential exists between the upper and lower heat-exchange assemblies, one or more secondary turbines can be employed between the outlets 210 and the ascending column 110.

Figure 8:
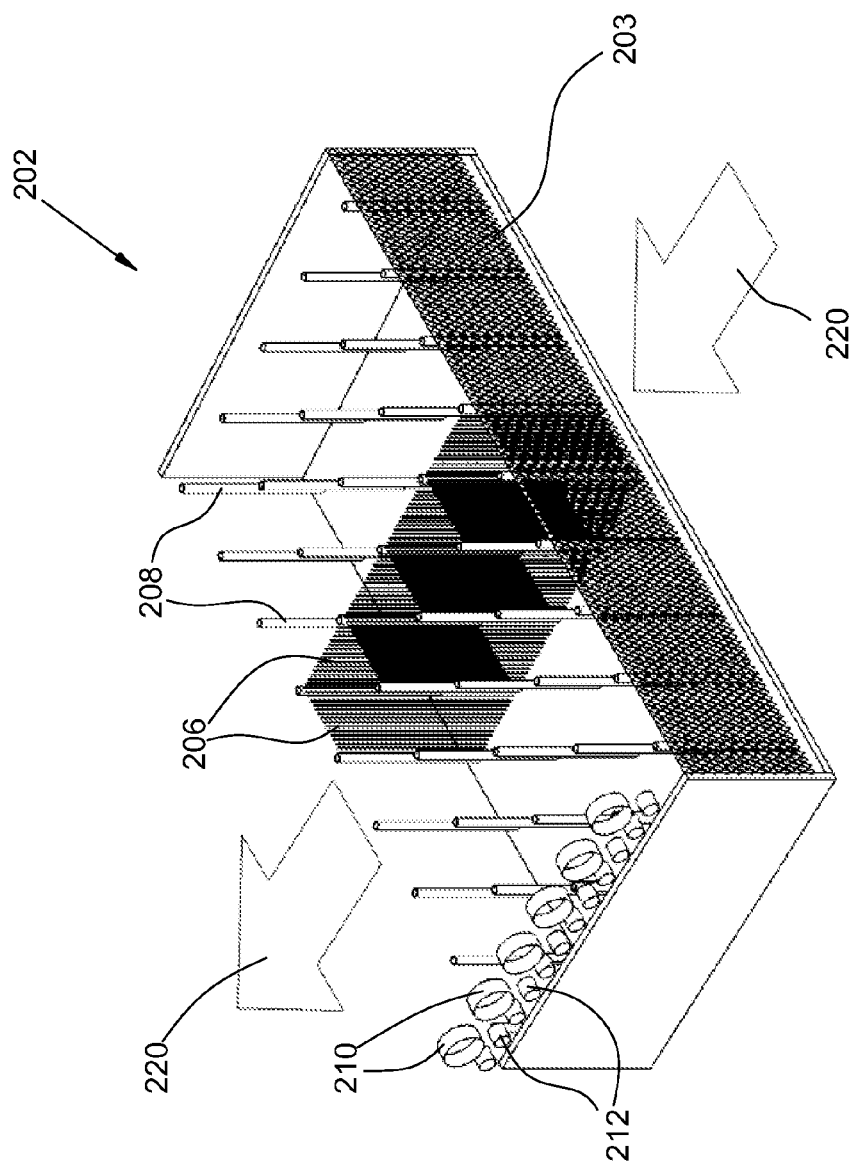
FIGS. 8-10 illustrate schematically an exemplary lower heat-exchanging subunit.
Figure 9:
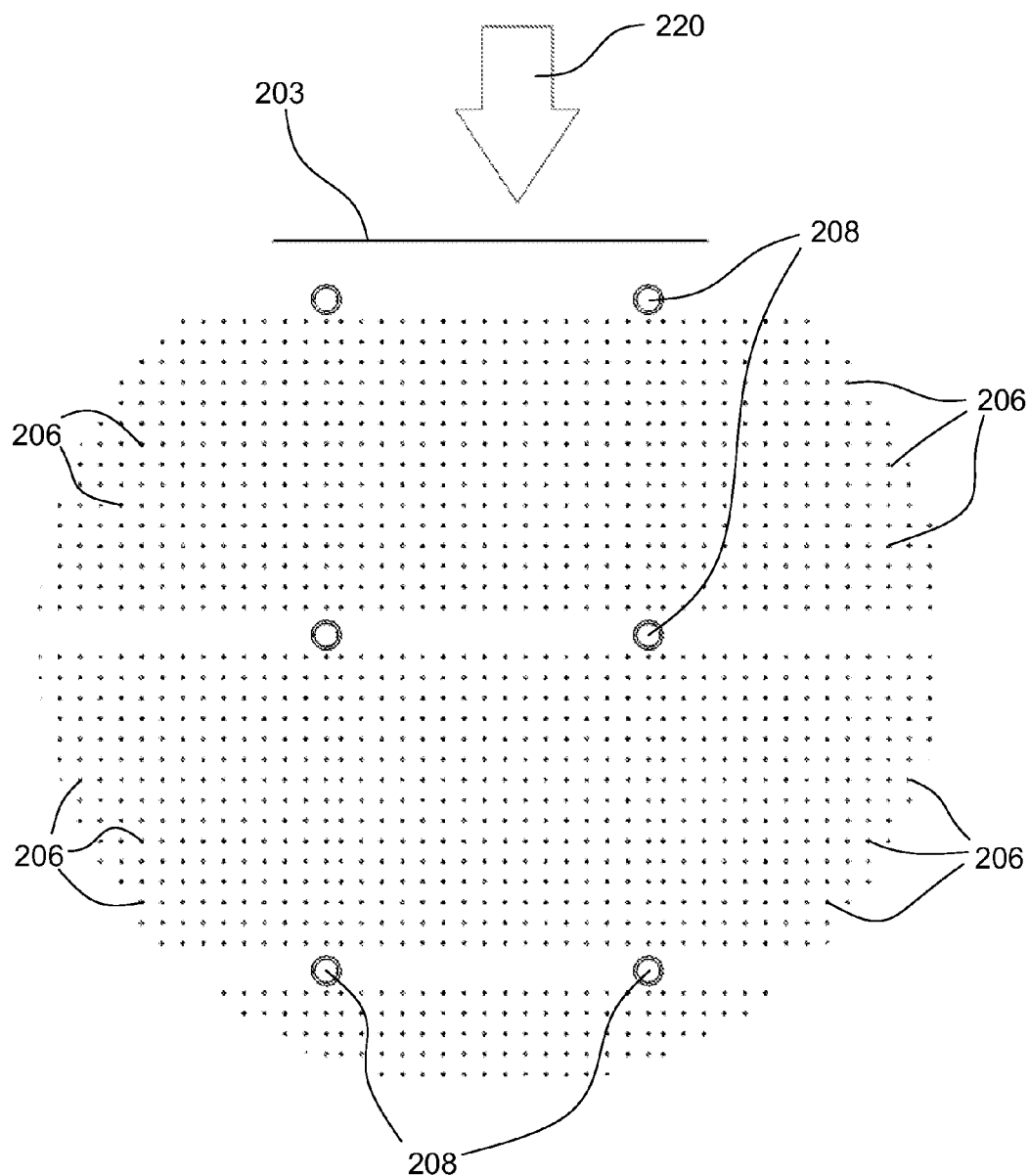
Figure 10:
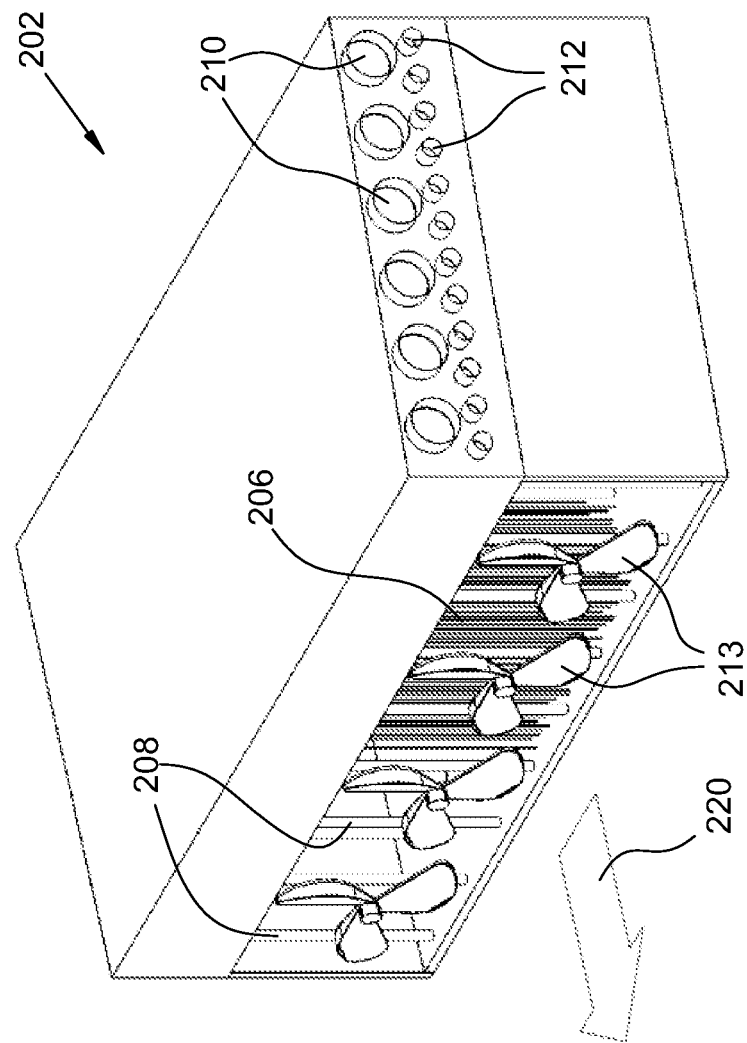

In the example of FIGS. 8-10, the heat-exchange tubes 206 comprise numerous substantially vertical tubes within the ambient-fluid passage. Heat is exchanged by the circulating fluid as it flows through tubes 206 and the ambient fluid as it flows through the passage (indicated by arrows 220). Other arrangements or adaptations of the heat-exchange tubes 206 can be employed, such as coils, fins, baffles, heat sinks, radiator structures, an so forth, to enhance heat exchange between the circulating and ambient fluids. Such structures, if employed, are preferably arranged so that flow of neither circulating nor ambient fluid is unduly impeded. It may be advantageous, in a phase-changing cycle, to arrange the heat-exchange tubes 206 so that circulating fluid enters the bottom of the substantially vertical tubes as a liquid and leaves the top of those tubes as a vapor.

In general, the arrangement of FIGS. 8-10 can be employed for heat exchange in either direction. In the examples disclosed herein, heat flows from the ambient fluid to the circulating fluid. The multiple heat-exchanging subunits are immersed in the ambient fluid. Examples of suitable ambient fluids can include, but are not limited to, air, atmospheric air, water, river water, lake water, seawater, or heated exhaust water from a conventional power plant (e.g., coal, gas, oil, trash, nuclear).

In one specific example, the multiple heat-exchanging subunits 202 are immersed in atmospheric air, and are arranged on an area of terrain that is elevated relative to an adjacent surrounding area of terrain (as in FIG. 11). Such an area can be a naturally occurring hill, plateau, or ridge, or can be an artificially constructed mound or similar structure. Each ring or row of heat-exchanging subunits 202 is arranged on the elevated terrain so that a temperature-induced density differential of the atmospheric air (that arises from the heat transfer from the atmospheric air to the circulating fluid) drives the flow of the atmospheric air through the ambient-fluid passages and then downhill toward the adjacent surrounding area of the terrain. Fans, turbines, pumps, or similar devices can be employed, if needed or desired, to initiate or enhance the ambient air flow through the ambient-fluid passages of the ring of subunits 202. Alternatively, turbines 213 can be employed to extract additional energy from the flow of ambient air through the subunit 202. Such turbines can be of any suitable type and can be coupled in any suitable way for using power thus extracted (e.g., by coupling turbine 213 to an electric power generator). For a land-based power-generating tower with a power output capacity of one or several gigawatts, the row or ring of subunits 202 is typically several kilometers in length or circumference (e.g., about five kilometers) to enable absorption of several times that amount of power from the atmospheric air to transfer to the circulating fluid. In one example, the subunits 200 can be configured so that a heat exchange surface area of about 25 to 45 million square meters can absorb about 20 gigawatts of heat from the ambient air flowing through them.

In another specific example, multiple heat-exchanging subunits 202 are arranged in at least one ring and are immersed in lake water or seawater (as in FIG. 7). The heat-exchanging subunits 202 are arranged near the surface of the lake water or seawater in an area of the lake water or seawater that is sufficiently deep so that the lake water or seawater that flows radially inward into the interior of the ring through the ambient-fluid passage can flow downward from the interior of the ring. As water is cooled by transfer of heat to the circulating fluid, it becomes more dense and tends to sink. Because the ring of subunits 202 is positioned near the water surface, the sinking cold water causes surface water to be drawn radially inward through the ambient-fluid passages and into the interior of the ring. The water is preferably deep enough to accommodate a somewhat coherent sinking column of cold water that does not impede or interfere with the flow of warmer water along the surface. Alternatively, a shroud-like structure can be constructed below the ring of subunits to maintain the coherence of the sinking column. The desired depth for maintaining a coherent sinking column without any additional shroud-like structure depends substantially monotonically on the diameter to the ring of subunits and the desired heat absorption. In one example, a coherent sinking column of cooled water about 70 m deep has been calculated to maintain a radially inward flow of about 4 knots for a 20 m thick layer of surface water for absorption of about seven terawatts from seawater by a ring of subunits about 2 km in diameter having about 130 to 210 million square meters of heat exchange surface area. Two rings of heat-exchanging subunits operating at that level of heat absorption from the seawater can yield about a terawatt of power generation from the turbines. Many other combinations of size, flow rate, depth, and heat absorption can be employed that yield a self-sustaining radially inward flow of surface water through the ambient-fluid passages of a ring of subunits 202. As noted above, a pump, propeller, impeller, turbine, or similar device can be employed to initiate or enhance the radially inward flow of seawater, if needed or desired. Alternatively, turbines 213 can be employed to extract additional energy from the flow of water through the subunit 202. Such turbines can be of any suitable type and can be coupled in any suitable way for using power thus extracted (e.g., by coupling turbine 213 to an electric power generator).

Placement of the power-generating system near seawater can enable a portion of the power generated to extract hydrogen from seawater (which is right at hand). The hydrogen thus generated can be employed in various fuel generation scenarios, while the oxygen might be beneficially released back into the seawater, perhaps mitigating the environmental phenomena of so-called "marine dead zones."

Land-based subunits 202 can be simply erected on the ground on the terrain where they are to be deployed. A simple box-like structure can be employed that contains or supports the heat-exchange tubes 206. Such a box-like structure would include opposing open sides to form the ambient-fluid passage. An adaptation of the box-like structure can be employed for water-borne subunits 202. Such water-borne subunits can include floats or other buoyant structures for supporting their weight near the surface of the water, or each subunit can be configured as a barge structure. The subunits can be connected together to form a substantially rigid ring structure, or can be secured together in a flexible manner to allow the ring to accommodate alterations in the water surface (waves, swells, chop, etc.) without stressing structural members. Such floating structures can be tethered or otherwise secured to the shore or to the sea floor or lake bed 14 to keep them in place. The tower structure 100 is typically built on shore, or at least in water shallower than that below the water-borne heat-exchange assemblies 200. To convey the circulating fluid between the water-borne heat-exchange assemblies 200 and the base of the tower structure 100, a boom, pier, or dock structure 204 (FIG. 1) can be employed to support piping connecting the bases of the descending and ascending columns to the inlets and outlets, respectively, of the subunits 202. Such a structure can be rigid or flexible in much the same manner as the rings, and can be supported rigidly from the sea or lake bed or by flotation. If floated, the boom, pier, or dock can be tethered to the shore or to the sea or lake bed 14 to keep it in place.

FIGS. 12-16 illustrate schematically an exemplary upper heat-exchange assembly 310. Typically, multiple such assemblies 310 are arranged on or within a framework or superstructure 300 supported by tower structure 100 (as in FIG. 1). The number of heat-exchange assemblies employed is typically determined by the height of the tower (which largely determines the temperature of the ambient air) and the desired heat dissipating capacity. The superstructure 300 is shown in FIG. 1 with an array of multiple upper heat exchange assemblies 310. Any suitable arrangement can be employed. Each of the heat-exchange assemblies 310 comprises an ambient-fluid passage 312, at least one circulating-fluid inlet 322, at least one circulating-fluid outlet 324, and multiple heat-exchange tubes 330. Each of the multiple heat-exchange tubes 330 connects at least one inlet 322 to at least one outlet 324 so as to convey circulating fluid from the connected inlet 322 through the heat-exchange tube 330 to the connected outlet 324. The multiple heat-exchange tubes 330 are arranged at least partly within the ambient-fluid passage 312 so as to enable heat transfer between circulating fluid conveyed through the heat-exchange tubes 330 and ambient fluid flowing through the ambient-fluid passage 312.

The basic arrangement of the upper heat-exchange assemblies 310 differs substantially from that of the lower heat-exchange assemblies 200, due primarily to their differing operating environments. The lower heat-exchange assemblies 200 operate in positions where the flow of ambient fluid is essentially restricted in the vertical dimension (by the ground or by the water surface). Multiple subunits are therefore arranged in one or more rings with radially directed ambient-fluid passages at a water surface or on high ground, or in one or more rows on high or sloping ground. Those arrangements along with their surroundings (high or sloping ground or a water surface) together cause the ambient-fluid flow to be driven in the desired direction (cooled air down slope from the land-based assembly; cooled water radially inward and downward from a water-borne assembly). In contrast, ambient fluid flow is unrestricted in any dimension at the upper heat-exchange assembly, which is surrounded by atmospheric air that can flow in any direction. The ambient-fluid passage 312 is therefore arranged so as to direct flow therethrough of the ambient fluid in a non-horizontal direction, taking advantage of the reduced density of atmospheric air heated (by heat shed from the circulating fluid) within the passage 312 to drive that heated air upward through the passage and draw cool air into the bottom of the passage. In general the heat-exchange assembly 312 can be used to heat the circulating fluid instead, cooling the ambient air in the passage 312 and driving air flow through the passage 312 downward. However, the examples disclosed herein all include upward flow of heated air through passage 312 due to heat absorbed from the circulating fluid.

To provide a long draft column to establish density-driven flow through the passage 312 (analogous to a chimney-like effect), the heat-exchange tubes 330 are typically located near the lower end of the ambient-fluid passage 312. In one exemplary embodiment, the ambient-fluid passage has a minimum diameter of about 30 meters, a minimum length of about 600 meters, and about 50,000-90,000 square meters or heat exchange surface area, and can absorb up to about 250 megawatts of power from the circulating fluid to transfer to the atmospheric air, resulting in an air velocity through the ambient-fluid passage 312 of about 70 m/s. The total power that can be dissipated can be determined by multiplying this figure by the number of heat-exchange assemblies employed in a given power-generating tower. For a land-based system generating on the order of a few gigawatts of electrical power, a tower height of a few kilometers (e.g., about five kilometers) can yield a sufficiently low atmospheric air temperature to yield sufficient heat dissipation. For a terawatt generation system (using water-borne lower heat exchange assemblies), even taller tower heights can be advantageously employed (reaching even colder portions of the atmosphere, or even into the stratosphere).

Each inlet 322 is connected by suitable piping or plumbing to branches 112 of the ascending column 110. If a phase-changing cycle is employed, the ascending column 110, its branches 112, and inlets 322 are typically relatively large diameter, low pressure structures. The exemplary arrangement shown in FIGS. 12-16 is adapted for use with a phase-changing cycle, although it could be used for other cycle types. The arrangement of FIGS. 12-16 is illustrative, and many other arrangements of the upper heat-exchange assembly 310 can be employed, with a cycle of any suitable or desired type, within the scope of the present disclosure or appended claims. The inlet 322 conveys the circulating fluid (in gaseous form in a phase-changing cycle) into a central bladder or reservoir 320 supported within passage 312 by structural members 318. The bladder 320 can be positioned within the passage 312 so that heat-exchange tubes 330 can be arranged radiating from the bladder toward the periphery of the passage 312. Because in this arrangement the bladder is positioned within the passage 312, it may be desirable to provide it with an aerodynamic shape to reduce drag from the air flow through the passage. Twelve groups of heat-exchange tubes 330 are shown in the exemplary embodiment, arranged somewhat symmetrically about the bladder 320. Other numbers and arrangements can be used. Gaseous circulating fluid enters the proximal ends of the heat-exchange tubes and condenses into liquid form as it releases heat to the air flowing through the passage 312. The heat-exchange tubes 330 are shown sloping downward to outlets 324, which are in turn connected to descending columns 114. The downward slope may be desirable with a phase-changing cycle, so that condensed circulating fluid can flow as a liquid downward toward the descending columns 114. Such a sloped arrangement may or may not be advantageous or desirable if an all-liquid or all-gaseous cycle is employed. An additional outlet 324 is provided at the base of bladder 320 to collect any liquid that might condense within the bladder. In an alternative exemplary arrangement, the fluid from the ascending column can enter the periphery of the heat-exchange assembly and flow to a central collection point as it is cooled or condensed. Many other arrangements can be employed.

In an exemplary implementation, air flow velocity within the passage 312 (driven by heating of the air by heat released by the condensing circulating fluid) can be harnessed for additional power generation. An air-driven turbine 340 is shown mounted within the passage 312 and arranged to be driven by the density-driven airflow through the passage. The rotation of the turbine 340 can be used for additional electrical power generation. Use of a turbine can reduce the air flow through passage 312, heat carried by that air flow, and therefore overall flow of circulating fluid through the system and power generation from that flow. Air turbine power generation also requires electrical generators and conductors to be housed along with the upper heat-exchange assemblies, increasing the weight that must be borne by the tower or its buoyant cells. Auxiliary tubes or passages 116 can be used for power conduction (among other uses, such as maintenance access, space launch capability, positioning and access to communications or positioning equipment, and so on). Various engineering, economic, or logistic considerations are typically weighed when considering whether to include air turbine power generation in the upper heat-exchange assemblies 310.

The upper or lower end of the passage 312 can be flared if desired. Such flaring at the ends of the passage 312 enables high flow velocities to be attained within the passage 312 while reducing the flow velocities at the entrance and exits, where the flow velocity can exert undesirable forces on the tower structure 100 or superstructure 300. In another exemplary implementation, airfoils 314 can be deployed at the top or bottom of the air passage 312 to direct the airflow in a controlled manner. Such vectoring of the entering or exiting air flow can be employed for counteracting lateral loading due to wind, for example.

Ammonia or various ammonia-rich mixtures (e.g., with water or hydrocarbons) can be suitable circulating fluid for a phase-changing cycle.

Instead of supporting the upper heat-exchange assemblies on a tower, they can be positioned on terrain that is elevated relative to the position of the lower heat-exchange assemblies, such as on a mountain or hillside. The ascending and descending columns would be routed up and down the mountainside or hillside.

Many variables must be considered in designing a particular power-generating system. The relative elevations of the upper and lower heat-exchange assemblies typically determine the temperature differential available to work with. The differential can be estimated based on the definition by the International Civil Aviation Organization of the international standard atmosphere, which is assumed to have an environmental lapse rate of 6.49° C./km from sea level to 11 kilometers (i.e., the atmospheric temperature drops 6.49° C. for every kilometer of elevation gain). The actual environmental lapse rate can vary by location, nearby terrain, elevation, season, and even time of day. Under some conditions the lapse rate can change sign (e.g., in a temperature inversion). A circulating fluid should be selected having a dry adiabatic lapse rate that is smaller than the environmental lapse rate at the location of power-generating system, to ensure that the circulating fluid can be at least slightly cooler than the ambient fluid at the lower heat-exchange assembly (to enable heat absorption from the ambient fluid) and at least slightly warmer than the ambient fluid at the upper heat-exchange assembly (to enable heat dissipation to the ambient fluid). A larger temperature difference between circulating and ambient fluids at the respective heat-exchange assemblies enables more rapid heat transfer between them, and can also result in larger density-driven ambient fluid flow rates through the heat-exchange assemblies. Larger ambient fluid flow rates can in turn enable higher levels of secondary power generation by ambient-fluid-driven turbines, if present.

The density-driven cycle will not function properly if the circulating fluid in the ascending column can reach thermal equilibrium with its surroundings (e.g., the ambient atmosphere). That is typically avoided by isolating the ascending column from its surroundings (e.g., by locating it within the center of a tower structure or by providing insulation on the ascending column), by arranging the ascending column as a single, large diameter passage (in which a relatively low surface area to volume ratio limits heat transfer between the circulating fluid and its surroundings), or by designing the system so that circulating fluid flow in the ascending column is sufficiently rapid to limit the amount of heat transferred to/from its surroundings.

In a phase-changing cycle, the temperature of the circulating fluid as it rises through the ascending column is typically determined not only by its dry adiabatic lapse rate, but also by its vapor pressure curve or vapor dome. The dry adiabatic lapse rate of the circulating fluid determines its elevation-dependent temperature and pressure as it rises through the ascending column only as long as its temperature and pressure lie outside (i.e., to the right of) the so-called vapor dome of its P-V diagram. For ammonia, the dry adiabatic lapse rate is about 4.6° C./km. At some point in the ascending column, the pressure and temperature of the circulating fluid reach the vapor dome, and condensation begins. From that point upward the elevation-dependent temperature and pressure are determined by the vapor pressure curve, and the heat of vaporization released by the condensing droplets of fluid causes a significant decrease in the lapse rate of the ascending circulating fluid. For ammonia, this so-called saturated lapse rate is about 2.1° C./km. In most cases the condensed droplets are entrained in the ascending flow of circulating fluid and carried into the upper heat-exchange assemblies (analogous to cloud formation in the atmosphere). While such condensation has been observed in prior art systems (e.g., U.S. Pat. No. 4,187,686 cited above) and regarded as something to be avoided or mitigated, in the presently disclosed systems such condensation (and the resulting reduction in the lapse rate) results in a desirable increase in the temperature of the circulating fluid that reaches the upper heat-exchange assemblies. A phase-changing power-generating system can be arranged so that a desired fraction of the vapor in the ascending column condenses as it rises through the column. The desired fraction of condensation in the ascending column can be at least 0.5%, at least 1%, at least 2%, at least 3%, at least 4%, or at least 5%. The desired fraction can be selected based on the size and power-generating capacity of the system.

The potential advantage derived from the decreased lapse rate due to condensation can be maximized by controlling the pressure of the circulating fluid vapor entering the ascending column, as illustrated by comparing the following arrangements. In a first instance, the circulating fluid temperature substantially matches the lower ambient fluid temperature at the lower heat exchange assembly and its pressure is substantially lower than the vapor pressure at that temperature; the circulating fluid vapor would be considered superheated. As the circulating fluid vapor rises through the ascending column, its temperature drops first at the higher dry lapse rate, and then at the lower saturated lapse rate after sufficient elevation has been gained and condensation begins, yielding a total temperature drop $\Delta T_1$. In a second instance, the circulating fluid temperature substantially matches the lower ambient fluid temperature while its pressure is at or only slightly lower than the vapor pressure at that temperature; the circulating fluid vapor would be considered saturated, or nearly so (if not quite saturated, then the vapor would be considered slightly superheated). As the nearly-saturated circulating fluid vapor rises through the ascending column, its temperature drops at the lower saturated lapse rate almost immediately, yielding a temperature drop $\Delta T_2$ with $|\Delta T_2|<|\Delta T_1|$. In other words, the circulating fluid reaches the upper heat-exchange assemblies at a higher temperature in the second instance than in the first, thereby enabling more efficient shedding of heat to the upper ambient fluid. This phenomenon can be exploited in cases wherein the available temperature differential between the upper and lower ambient fluids is relatively small, placing a premium on minimizing the temperature drop of the circulating fluid in the ascending column.

The circulating fluid pressure at the base of the ascending column can be controlled in any suitable way. One convenient way might include a variable number of turbines placed in the circulating fluid path between the bottoms of the descending and ascending columns. For example, a set of suitably arranged, controllable valves can be employed to alter the number of power-generating turbines 400 that the circulating fluid drives after leaving the bottom of descending columns 114 and before entering the lower heat-exchange assemblies 200, or the operating parameters of the turbines can be altered to control the pressure drop through them. The number or operating parameters of the turbines can be controlled in response to changes in the lower ambient fluid temperature (diurnal, seasonal, etc) to maintain the circulating fluid vapor near its saturation point as it enters the bottom of the ascending column.

Additional adaptations can be employed for implementing a power-generating system using upper and lower heat exchangers with elevation or altitude differentials between those heat exchangers that might result in corresponding temperature differentials that are otherwise too small to be practicable (e.g., too small to drive sufficient heat exchange in the heat exchangers), or a system at a location where a temperature inversion can sometimes reduce the usable temperature differential. One adaptation that can be employed includes exploitation of diurnal variations in temperature, wherein a majority of heat absorption at the lower heat-exchange assemblies occurs during the day and a majority of heat dissipation at the upper heat-exchange assemblies occurs at night. For example, a reservoir of circulating fluid can be employed that is cooled (and condensed, in a phase-changing cycle) at night at the upper heat-exchange assemblies and stored until daytime, when it is heated (and boiled, in a phase-changing cycle) at the lower heat-exchange assemblies.

In a first example, a large thermal mass can be employed as a heat reservoir. Such a thermal mass can comprises concrete, water, metal, or other material having a suitably high heat capacity. The thermal mass can be provided with suitable flow channels and heat exchange structures (coils, fins, and so on) to facilitate heat transfer with the circulating fluid. Suitable piping or lining is provided to prevent direct contact between the circulating fluid and the thermal mass, if such contact is undesirable (e.g., contact between ammonia as the circulating fluid and water at the thermal mass). Such thermal masses can be placed near the lower heat-exchange assemblies and collect heat during the day. At night, the circulating fluid can be routed to absorb heat from the thermal mass instead of from the lower heat-exchange assemblies. Similarly, a thermal mass can be placed near the upper heat-exchange assemblies (if they are built on elevated terrain; probably not suitable for a tower-borne system) and allowed to cool at night. During the day, the circulating fluid can be routed to shed heat into the thermal mass instead of into the upper heat-exchange assemblies. Each thermal mass should be sufficiently large to absorb enough heat to drive the system during the corresponding portion of the diurnal cycle, which can result in impractically large masses. A suitably large volume of sand could be employed as a thermal mass, providing the advantages of being chemically inert relative to many circulating fluids and for providing a very large surface to mass ratio if the circulating fluid flows directly through the sand. On one example, about 1.5 to 2 million cubic meters of sand would store sufficient heat to drive a one megawatt net output ammonia phase-changing cycle with about one kilometer of elevation differential and a temperature differential about 1° C. between the circulating fluid and the sand.

Figure 22:
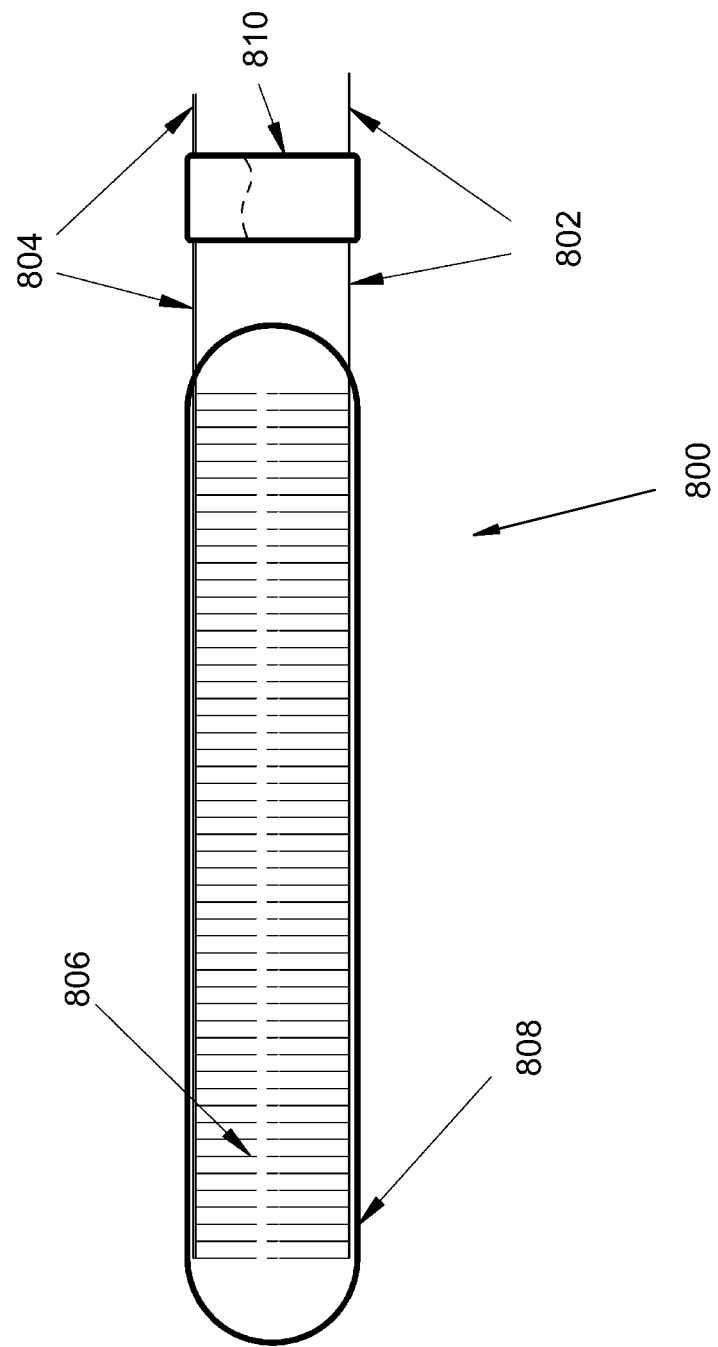
FIG. 22 illustrates schematically an exemplary heat storage assembly.

An exemplary thermal mass 800 arranged for storage of heat at the bottom of the power-generating tower is illustrated schematically in FIG. 22. Gaseous circulating fluid boiled in the lower heat-exchange assemblies 200 enters through lines 804, is recondensed in elements 806, exits through lines 802, and is stored as condensed liquid in storage tank 810. Elements 806 are immersed in water, sand, a pebble-bed, or other suitable thermal mass material in a tank 808. If a liquid thermal mass is employed, it can be circulated within tank 808 to facilitate heat exchange. The elements 806 can be open or closed, depending on whether contact between the circulating fluid and the thermal mass material can be permitted or not. A closed tank 808 is needed if the elements 806 are open or if a liquid thermal mass material is used; tank 808 can be omitted if elements 806 are closed and if the thermal mass material is solid. Heat from the lower heat exchange assemblies 200 can thus be stored in the thermal mass material and the condensed fluid stored in tank 810 during the day. At night, heat from the thermal mass material can reboil the circulating fluid entering through lines 802 from tank 810, and the boiled fluid exits through lines 804 and enters the ascending columns 112. The condensed circulating fluid tank 810 can be located outside the thermal mass tank 808 (as shown in FIG. 22) or within the volume of the thermal mass tank 808; the heat exchanger plumbing inside the thermal mass tank 808 could also serve as storage volume for the condensed fluid. If the elements 806 are open then condensed liquid storage can occur directly inside the thermal mass tank 808 in the same volume as the thermal mass material.

In a second example, heat is stored during a diurnal cycle by phase change of the circulating fluid. At night, the circulating fluid condensed at the upper heat-exchange assemblies is stored in a reservoir at about the same elevation. During the day, when the upper heat-exchange assemblies may be too warm to condense the circulating fluid, the stored fluid from the upper reservoir is routed into the descending column. Because the circulating fluid stored near the upper heat-exchange assemblies is in liquid form, it can be stored in a relatively small volume (e.g., about 8000-9000 m$^3$ for a megawatt-scale power generator operated with about a one kilometer elevation differential). At the lower heat-exchange assembly, the circulating fluid collected during the night is boiled during the day is directed into one or more vapor storage tanks (of much greater volume than the liquid storage tank; described further below) at about the same elevation. The vapor storage tanks are adapted as described below to keep the circulating fluid at the correct pressure for the temperature of the lower ambient fluid during the day. During the night, when the lower heat-exchange assemblies are too cool to boil the circulating fluid, the stored vapor is released from the vapor storage tanks, enters and rises through the ascending column, and is condensed at the upper heat-exchange assembly.

Figure 18:
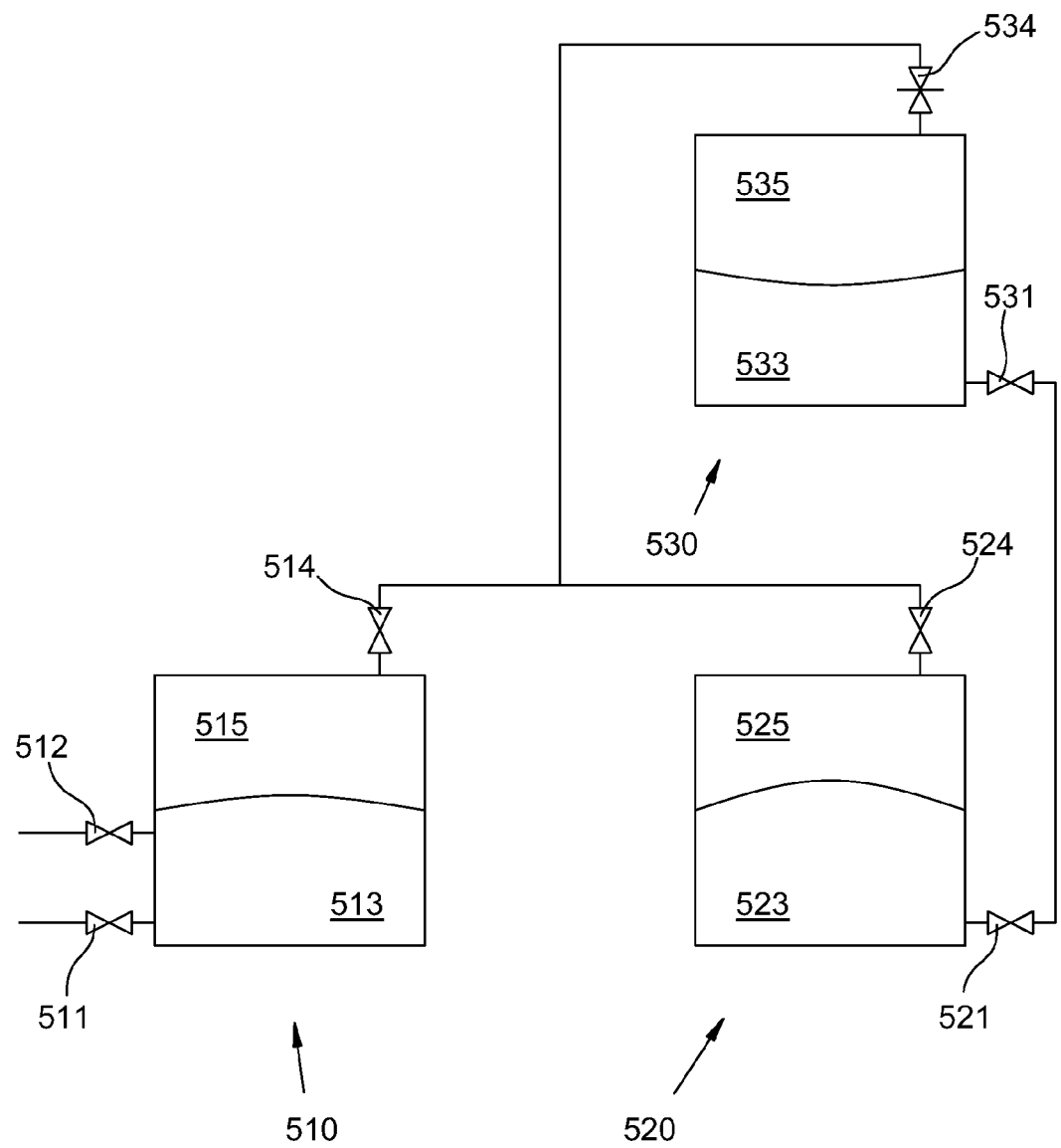
FIGS. 18 and 19A-19B illustrate schematically exemplary arrangements of storage tanks for the circulating fluid.

In FIG. 18 is illustrated an exemplary arrangement for controlling the pressure of the circulating fluid as it is boiled in a phase-changing cycle at the lower heat-exchange assembly and then released into the ascending column. In its simplest form the arrangement comprises three tanks, each divided into upper and lower chambers by a flexible partition that equalizes the pressure between the two chambers. Tank 510 has two valves 511 and 512 connected to its lower chamber 513 and one valve 514 connected to its upper chamber 515, and is used to store circulating fluid (liquid or vapor) in its lower chamber 513 (with liquid circulating fluid typically entering or exiting through valve 511 and gaseous circulating fluid typically entering or exiting through valve 512). Tank 520 has a valve 521 connected to its lower chamber 523 and a valve 524 connected to its upper chamber 525, and is used to stored liquid water in its lower chamber 523. Tank 530 has a valve 531 connected to its lower chamber 533 and a valve 534 connected to its upper chamber 535, and is used to store liquid water in its lower chamber 533. The upper chambers of all three tanks contain air. Valves 514, 524, and 534 are all connected to a common air manifold, and valves 521 and 531 are connected to a common water manifold. Tank 530 is positioned at an elevation $\Delta H$ above tank 520.

With valves 514 and 524 open and valve 534 closed, the air pressure in chambers 515 and 525 are equalized. By opening valves 521 and 531, a head pressure $P = \rho_{water} g \Delta H$ develops in chamber 523. That head pressure is in turn exerted in chamber 515 (via chamber 525 through valves 524 and 514) as it fills with boiled circulating fluid during the day or is emptied of that fluid during the night (through open valve 512). By altering $\Delta H$ accordingly, the desired pressure (at a given temperature) can be maintained in the lower chamber 513 of the circulating fluid storage tank 510. In practice it might be impractical to alter the elevation of water tank 530. Instead, a series of tanks 530 (not shown) can be employed at a sequence of increasing elevations above tank 520 and all connected to the air and water manifolds in a like manner. The desired boiling pressure for the circulating fluid can be obtained by opening and closing the correct valves 531 and 534 to select the tank 530 that is at an elevation to produce the desired head pressure. Such a tank-sequence arrangement also can also serve to reduce the volume required of each tank 520 or 530. As all of the water is driven from chamber 523 of tank 520, valves 521, 531, 524, and 534 can be opened or closed as appropriate so that the tank that had previously acted as tank 530 (and is now full of water driven from the previous tank 520) can act as the next tank 520, with the next tank in the sequence at the correct elevation difference acting as the next tank 530. Such a sequence can be repeated multiple times, driving the same volume of water to successively higher elevation yet applying the same head pressure to chamber 515 of tank 510. For emptying the circulating fluid from chamber 515, the sequence can be reversed, with the same volume of water flowing down from each successive tank 530 to corresponding tank 520. The tank elevation differential employed while emptying need not be the same that was used for filling, and can differ based on differing temperature conditions during filling and emptying. If desired, multiple tanks 510 can be employed, each connected to tanks 520 and 530 (or series of such tanks) as needed or desired.

Figure 19A:
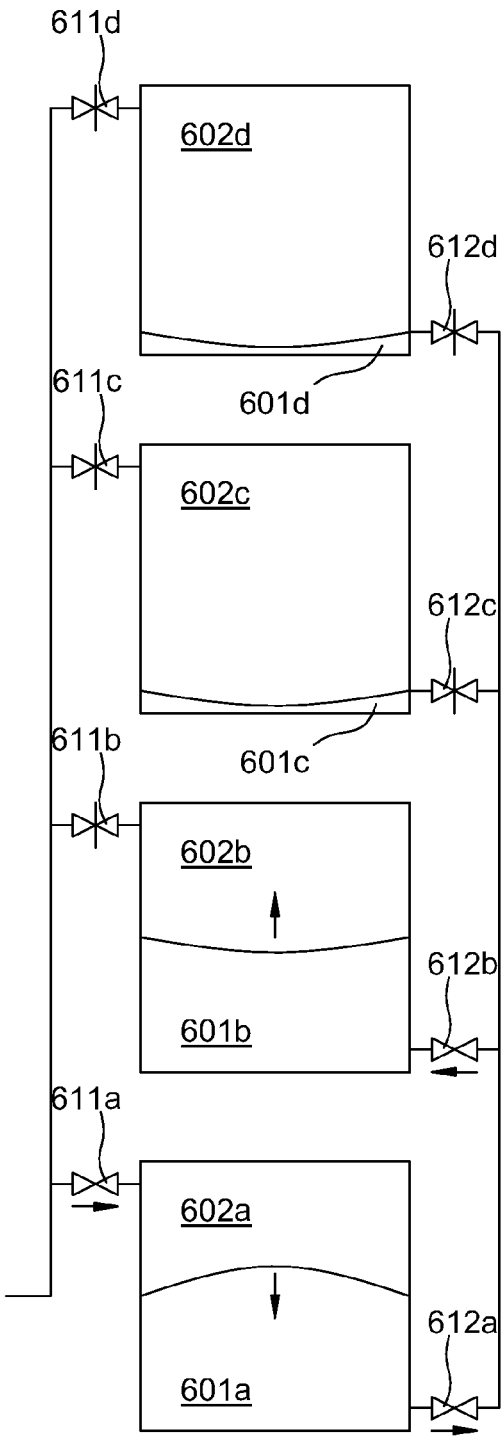
Figure 19B:
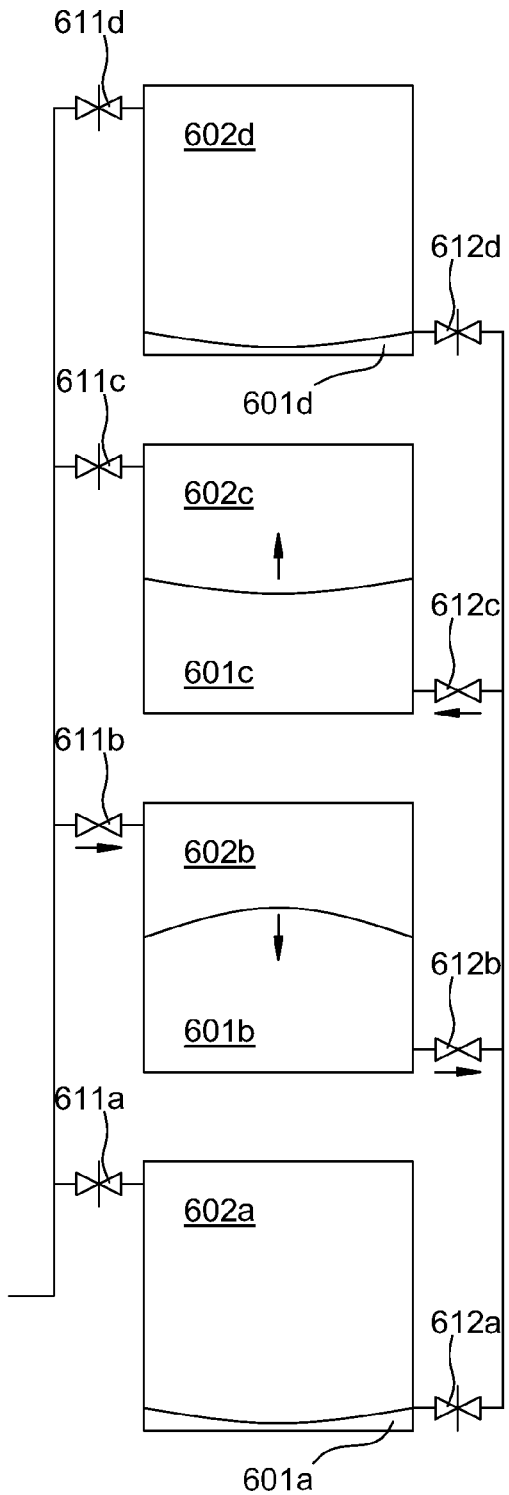
Figure 20:
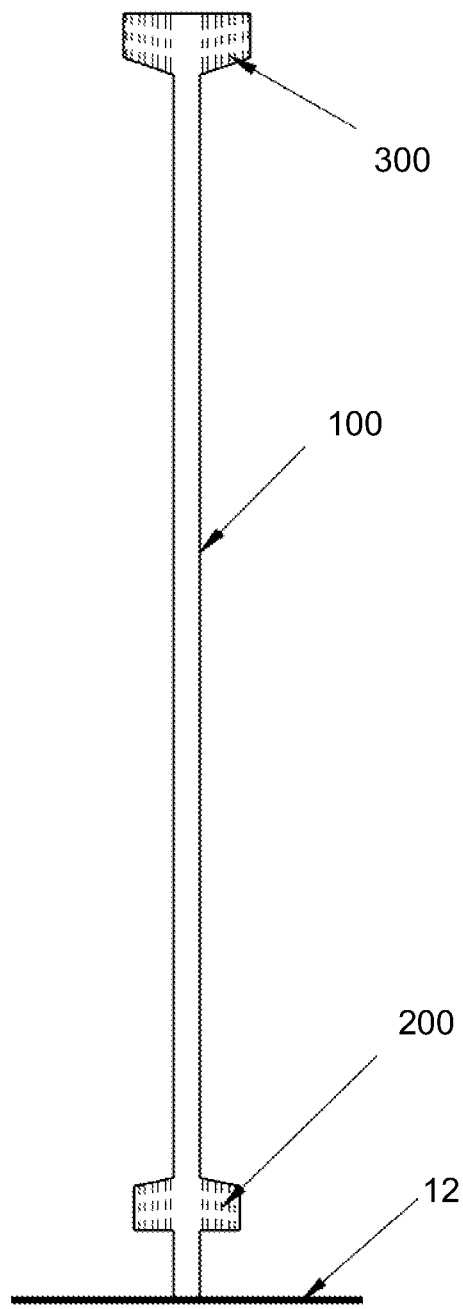
FIG. 20 illustrates schematically an exemplary power-generating tower.

In FIGS. 19A and 19B is illustrated another exemplary arrangement for controlling the pressure of the circulating fluid as it is boiled in a phase-changing cycle at the lower heat-exchange assembly and then released into the ascending column. The arrangement comprises a sequence of tanks arranged at successively higher elevations, each divided into respective upper chambers 602 (602a, 602b, an so on) and lower chambers 601 (601a, 601b, and so on) by a flexible partition that equalizes the pressure between the two chambers in each tank. Each tank has a corresponding valve 611 connected to upper chamber 602 and a corresponding valve 612 connected to chamber 601. The valves 611 of the tanks are all connected to a circulating fluid manifold, and the valves 612 are all connected to a water manifold.

With valves 611a and 612a/b open and valves 611b/c/d and 612c/d closed, chamber 602a of the first tank fills with circulating fluid vapor through open valve 611a and water from chamber 601a is forced through open valves 612a/b into chamber 601b at a head pressure determined by the elevation difference between the tanks (flows indicated by arrows in FIG. 19A). After chamber 602a is filled (with circulating fluid vapor at a pressure determined by the tank elevation differential) and most of the water has been forced into chamber 601b, valves 611a and 612a are closed and valves 611b and 612c are opened. Circulating fluid vapor fills chamber 602b through open valve 611b and water from chamber 601b is forced through open valves 612b/c into chamber 601c at a head pressure determined by the elevation difference between the tanks (flows indicated by arrows in FIG. 19A). If the tanks are substantially uniformly spaced in elevation, then each chamber 602 will be filled with circulating fluid vapor at substantially the same pressure. Such a sequence can be repeated multiple times, driving the same volume of water to successively higher elevation yet applying the same head pressure to chambers 602 at each stage. Each tank can be connected to any tank further up the elevation sequence to achieve the desired boiling pressure. If a larger pressure is desired that requires tanks to be skipped (e.g., filling the $1^{st}$, $4^{th}$ and $7^{th}$ tanks, and so on), then additional tank sequences can be filled until most or all tanks are filled (e.g., $2^{nd}$, $5^{th}$, $8^{th}$, ...; $3^{rd}$, $6^{th}$, $9^{th}$, ...). Whichever tank filling sequence is employed, the tanks can be emptied using an analogous sequence. The tank elevation differential employed while emptying need not be the same that was used for filling, and can differ based on differing temperature conditions during filling and emptying. If desired, multiple, functionally parallel tank sequences can be employed, as needed or desired.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including,"

"having," and variants thereof shall be construed as open ended terminology, with the same meaning as if the phrase "at least" were appended after each instance thereof.

In the appended claims, if the provisions of 35 USC §112 ¶ 6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶ 6 are not intended to be invoked for that claim.

What is claimed is:

1. An apparatus comprising:
   at least one lower heat-exchange assembly;
   at least one upper heat-exchange assembly positioned at an elevation higher than that of the lower heat-exchange assembly;
   at least one ascending circulating-fluid column;
   at least one descending circulating-fluid column; and
   at least one turbine,
   wherein each lower heat-exchange assembly comprises multiple lower heat-exchanging subunits, (a) each of the heat-exchanging subunits comprising (i) a lower ambient-fluid passage, (ii) at least one lower circulating-fluid inlet, (iii) at least one lower circulating-fluid outlet, and (iv) multiple lower heat-exchange tubes, each of the multiple lower heat-exchange tubes connecting at least one lower inlet to at least one lower outlet so as to convey circulating fluid from the connected lower inlet through the lower heat-exchange tube to the connected lower outlet; (b) in each of the multiple lower heat-exchanging subunits, the multiple lower heat-exchange tubes being arranged at least partly within the lower ambient-fluid passage so as to enable heat transfer from lower ambient fluid flowing through the lower ambient-fluid passage to circulating fluid conveyed through the lower heat-exchange tubes; (c) the multiple lower heat-exchanging subunits being arranged in at least one substantially row or ring so as to direct flow of the lower ambient fluid through the lower ambient-fluid passages of the multiple lower heat-exchanging subunits; and (d) each row or ring of multiple lower heat-exchanging subunits being arranged within the lower ambient fluid so that a temperature-induced density differential of the lower ambient fluid, which density differential arises from the heat transfer to the circulating fluid, drives the flow of the lower ambient fluid through the lower ambient-fluid passages,
   wherein each upper heat-exchange assembly comprises (a) an upper ambient-fluid passage; (b) at least one upper circulating-fluid inlet; (c) at least one upper circulating-fluid outlet; and (d) multiple upper heat-exchange tubes, each of the multiple upper heat-exchange tubes connecting at least one upper inlet to at least one upper outlet so as to convey the circulating fluid from the connected upper inlet through the upper heat-exchange tube to the connected upper outlet, wherein (e) the multiple upper heat-exchange tubes are arranged at least partly within the upper ambient-fluid passage so as to enable heat transfer from the circulating fluid conveyed through the upper heat-exchange tubes to upper ambient fluid flowing through the upper ambient-fluid passage; (f) the upper ambient-fluid passage is arranged so as to direct flow therethrough of the upper ambient fluid in a non-horizontal direction; (g) the upper heat-exchange assembly is arranged so as to drive the flow of the upper ambient fluid upward through the upper ambient-fluid passage by a temperature-induced density differential, which density differential arises from the heat transfer from the circulating fluid, between the flowing upper ambient fluid at opposing ends of the upper ambient-fluid passage; and (h) the upper heat-exchange assembly is immersed in the upper ambient fluid, which upper ambient fluid comprises atmospheric air,
   wherein each ascending column is arranged and connected to receive the circulating fluid from at least one of the lower heat-exchange assemblies and to convey the circulating fluid thus received upward and into at least one of the upper heat-exchange assemblies,
   wherein each descending column is arranged and connected to receive the circulating fluid from at least one of the upper heat-exchange assemblies and to convey the circulating fluid thus received downward and into at least one of the lower heat-exchange assemblies, and
   wherein the turbine is arranged to be driven by flow of circulating fluid.

2. A method comprising:
   (i) transferring heat from lower ambient fluid to a circulating fluid in at least one lower heat-exchange assembly;
   (ii) conveying the circulating fluid from each lower heat-exchange assembly upward through at least one ascending column to at least one upper heat-exchange assembly positioned at an elevation higher than that of the lower heat-exchange assembly;
   (iii) transferring heat from the circulating fluid to upper ambient fluid in each upper heat-exchange assembly;
   (iv) conveying the circulating fluid from each upper heat-exchange assembly downward through at least one descending column in the tower structure; and
   (v) driving at least one turbine with flow of the circulating fluid,
   wherein each lower heat-exchange assembly comprises multiple lower heat-exchanging subunits, (a) each of the heat-exchanging subunits comprising (i) a lower ambient-fluid passage, (ii) at least one lower circulating-fluid inlet, (iii) at least one lower circulating-fluid outlet, and (iv) multiple lower heat-exchange tubes, each of the multiple lower heat-exchange tubes connecting at least one lower inlet to at least one lower outlet so as to convey the circulating fluid from the connected lower inlet through the lower heat-exchange tube to the connected lower outlet; (b) in each of the multiple lower heat-exchanging subunits, the multiple lower heat-exchange tubes being arranged at least partly within the lower ambient-fluid passage so as to enable heat transfer from the lower ambient fluid flowing through the lower ambient-fluid passage to circulating fluid conveyed through the lower heat-exchange tubes; (c) the multiple lower heat-exchanging subunits being arranged in at least one substantially horizontal row or ring so as to direct flow of the lower ambient fluid through the lower ambient-fluid passages of the multiple lower heat-exchanging subunits; and (d) each row or ring of multiple lower heat-exchanging subunits being arranged within the lower ambient fluid so that a temperature-induced density differential of the lower ambient fluid, which density differential arises from the heat transfer to the circulating fluid, drives the flow of the lower ambient fluid through the lower ambient-fluid passages,
   wherein each upper heat-exchange assembly comprises (a) an upper ambient-fluid passage; (b) at least one upper circulating-fluid inlet; (c) at least one upper circulating-fluid outlet; and (d) multiple upper heat-exchange tubes, each of the multiple upper heat-exchange tubes connecting at least one upper inlet to at least one upper outlet so as to convey the circulating fluid from the connected upper inlet through the upper heat-exchange tube to the connected upper outlet, wherein (e) the multiple upper heat-exchange tubes are arranged at least partly within the upper ambient-fluid passage so as to enable heat transfer from the circulating fluid conveyed through the upper heat-exchange tubes to upper ambient fluid flowing through the upper ambient-fluid passage; (f) the upper ambient-fluid passage is arranged so as to direct flow therethrough of the upper ambient fluid in a non-horizontal direction; (g) the upper heat-exchange assembly is arranged so as to drive the flow of the upper ambient fluid upward through the upper ambient-fluid passage by a temperature-induced density differential, which density differential arises from the heat transfer from the circulating fluid, between the flowing upper ambient fluid at opposing ends of the upper ambient-fluid passage; and (h) the upper heat-exchange assembly is immersed in the upper ambient fluid, which upper ambient fluid comprises atmospheric air, wherein each ascending column is arranged and connected to receive the circulating fluid from at least one of the lower heat-exchange assemblies and to convey the circulating fluid thus received upward and into at least one of the upper heat-exchange assemblies, wherein each descending column is arranged and connected to receive the circulating fluid from at least one of the upper heat-exchange assemblies and to convey the circulating fluid thus received downward and into at least one of the lower heat-exchange assemblies, and wherein the turbine is arranged to be driven by flow of circulating fluid.

* * * * *

UNITED STATES PATENT AND TRADEMARK OFFICE
CERTIFICATE OF CORRECTION

| | | |
|---|---|---|
| PATENT NO. | : 8,640,461 B2 | Page 1 of 1 |
| APPLICATION NO. | : 12/709215 | |
| DATED | : February 4, 2014 | |
| INVENTOR(S) | : Thompson | |

It is certified that error appears in the above-identified patent and that said Letters Patent is hereby corrected as shown below:

In the claims

Column 21, line 38 Claim 1 insert -- horizontal -- between "substantially" and "row".

Signed and Sealed this
Twenty-sixth Day of January, 2016

Michelle K. Lee
*Director of the United States Patent and Trademark Office*